United States Patent
Yakashiro

(10) Patent No.: US 6,226,702 B1
(45) Date of Patent: May 1, 2001

(54) BUS CONTROL APPARATUS USING PLURAL ALLOCATION PROTOCOLS AND RESPONSIVE TO DEVICE BUS REQUEST ACTIVITY

(75) Inventor: Masataka Yakashiro, Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 09/262,116

(22) Filed: Mar. 4, 1999

(30) Foreign Application Priority Data

May 3, 1998 (JP) .................................. 10-053296

(51) Int. Cl.[7] .................................................. G06F 13/00
(52) U.S. Cl. ........................... 710/107; 710/105; 710/11; 710/16; 710/56; 710/241
(58) Field of Search ..................... 710/107, 110, 710/112, 115, 117, 120, 122, 124, 125, 241, 242, 244, 105, 11, 14, 16, 56

(56) References Cited

U.S. PATENT DOCUMENTS

| 4,096,571 | * | 6/1978 | Vander Mey | 710/117 |
| 5,239,631 | * | 8/1993 | Boury et al. | 710/241 |
| 5,241,632 | * | 8/1993 | O'Connell et al. | 710/112 |
| 5,274,774 | * | 12/1993 | Manber et al. | 710/112 |
| 5,283,902 | * | 2/1994 | Dorn | 710/241 |
| 5,481,680 | * | 1/1996 | Larson et al. | 710/112 |
| 5,499,345 | * | 3/1996 | Wantanabe | 710/117 |
| 5,533,205 | * | 7/1996 | Blackledge, Jr. et al. | 710/117 |
| 5,560,016 | * | 9/1996 | Fiebrich et al. | 710/240 |
| 5,583,999 | * | 12/1996 | Sato et al. | 710/100 |
| 5,598,542 | * | 1/1997 | Leung | 710/117 |
| 5,717,872 | * | 2/1998 | Whittaker | 710/115 |
| 5,754,800 | * | 5/1998 | Lentz et al. | 710/116 |
| 5,845,097 | * | 12/1998 | Kang et al. | 710/117 |

FOREIGN PATENT DOCUMENTS

| 64-59558 | 3/1989 | (JP) . |
| 1-288952 | 11/1989 | (JP) . |
| 3-6741 | 1/1991 | (JP) . |
| 6-110828 | 4/1994 | (JP) . |
| 9-185580 | 7/1997 | (JP) . |

* cited by examiner

Primary Examiner—Ayaz R. Sheikh
Assistant Examiner—Raymond N Phan
(74) Attorney, Agent, or Firm—Foley & Lardner

(57) ABSTRACT

In a bus control apparatus, a plurality of counters are employed in addition to a plurality of data input/output devices such as a memory, a modem, and a graphic board. These data input/output devices are connected to a bus, and issue bus allocation request signals. These counters count the number of bus allocation request signals issued from these data input/output devices. A bus allocation control unit controls such that this bus is allocated to which data input/output device for having the bus allocation request based upon the counted number of the bus allocation request signal. Thus, the utilization efficiency of this bus is increased.

26 Claims, 12 Drawing Sheets

Fig.3 (1)
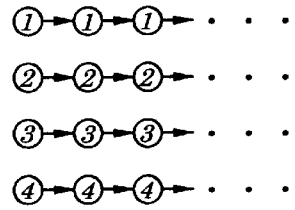
Fig.3 (2)
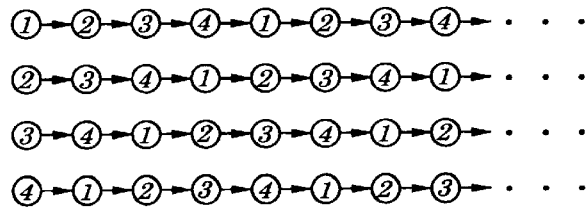
Fig.3 (3)
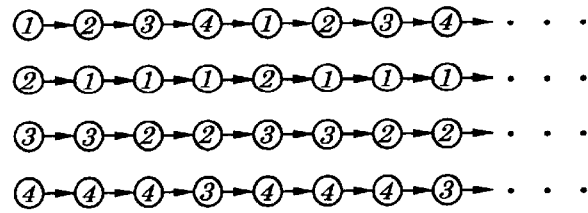

Fig.4 (1)
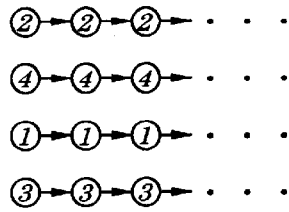
perfect type order-varied allocation protocol
Fig.4 (2)
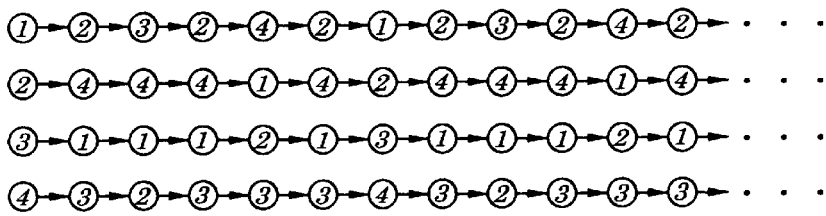
order rotation type order-varied allocation protocol
Fig.4 (3)
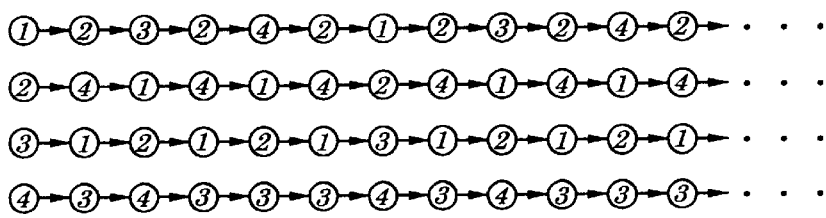
order emphasis type order-varied allocation protocol
Fig.4 (4)
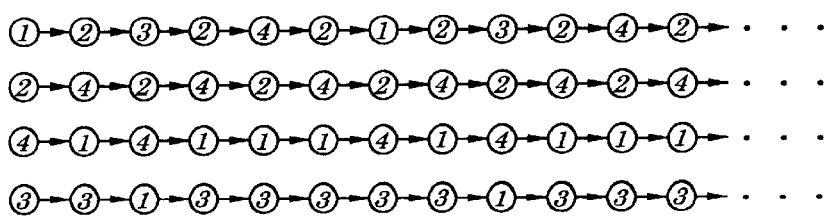
composite type order-varied allocation protocol

BUS CONTROL APPARATUS USING PLURAL ALLOCATION PROTOCOLS AND RESPONSIVE TO DEVICE BUS REQUEST ACTIVITY

BACKGROUND OF THE INVENTION

1. Field of the Invention

The present invention is generally related to a bus control method, a bus control apparatus, and also a storage medium for storing thereinto a bus control program. More specifically, the present invention is directed to bus control method/system capable of controlling such that which bus is allocated to which data input/output means (memory, LAN board, modem etc) in response to a bus allocation request issued from the respective data input/output means in a control system where a plurality of data input/output means are connected to the buses, and further directed to a storage medium for storing thereinto a bus control program.

2. Description of the Related Art

The above-described sort of bus control apparatus is known in this field. For example, Japanese Paten Laid-open t Application No. Hei-6-332841 published in 1994 discloses the bus control apparatus which is applied to a computer system. That is, FIG. 12 is a schematic block diagram for representing an internal arrangement of this conventional computer system.

This sort of computer system is mainly arranged by a CPU (central processing unit) 1, a memory 2, a plurality of data input/output means 3 to 5, and a bus control apparatus 6. These structural elements are connected via a bus 7 to each other.

In the case that the CPU 1 and these data input/output means 3 to 5 (will be collectively referred to as a "device" hereinafter) request to access the memory 2 and other devices via the bus 7, the CPU 1 and the data input/output means 3 to 5 supply allocation request signals $REQ_1$ to $REQ_4$ to the bus control apparatus 6, respectively. As a result, in order to avoid such a risk that a plurality of devices will make simultaneous accesses via the bus 7, the bus control apparatus 6 determines which device may be allowed to be accessed via the bus 7. Then, this bus control apparatus 6 supplies allocation permission signals $GNT_1$ to $GNT_4$ to the determined device. Such a device to which the allocation permission signal GNT is supplied accesses via the bus 7 the memory 2, or another device. When this access operation is accomplished, this device supplies an end signal DON to the bus control apparatus 6. Also, when the bus control apparatus 6 detects an error while investigating which device is allowed to be allocated via the bus 7, this bus control apparatus 6 supplies an error signal ERR to the CPU 1.

Although not shown in this drawing, the bus control apparatus 6 is mainly implemental by an arbiter controller, an arbiter memory, and a history register.

When any one of the allocation request signals $REQ_1$ to $REQ_4$ is supplied to the arbiter controller, this arbiter controller supplies 4-bit data (request bit) to the arbiter memory as low-order bits of an address of the arbiter memory. This 4-bit request data is formed by setting "1" to the bits corresponding to the supplied allocation request signal REQ. On the other hand, the past allocation permission histories as to the respective devices are stored in a first-in-first-out (FIFO) manner into the history register. In this example, since only one device is allowed to be allocated at a time, this past allocation permission history is constituted by 4 sets of data immediately close to the 4-bit data, namely 16-bit data. This 4-bit data is formed by setting "1" only to the bits corresponding to the allocation-permitted device. This past allocation permission history is supplied to the arbiter memory as an higher order bit of the address of the arbiter memory.

In this arbiter memory, the various algorithms are stored. That is, a priority order allocation permission algorithm and another allocation permission algorithm such as the round robin algorithm are stored. This priority order allocation permission algorithm corresponds to various combinations between the present allocation requests (request bits) supplied from the respective devices and the past allocation permission histories supplied from the history register. In other words, this priority order allocation permission algorithm implies that while priority orders are previously applied to a plurality of devices connected to a bus, when allocation request signals REQ are simultaneously supplied from a plurality of devices, only such a device having a top priority order is allowed to be allocated.

On the other hand, the round robin algorithm corresponds to such an algorithm that until allocation permissions for all of devices are accomplished one time, when allocation request signals REQs are simultaneously supplied from a plurality of devices, allocation permissions are applied to such devices which have not yet received the allocation permissions in the past. After the allocation permissions for all of these devices are ended one time, in such a case that the allocation request signals REQs are supplied from these plural devices at the same time, the allocation permission is applied to a device to which the allocation permission has been given in the earliest stage of the first cycle, while having a top priority.

As a result, since the allocation permission corresponding to the supplied 20-bit data is read out from the arbiter memory, the arbiter controller supplies the allocation permission signal GNT to any one of these devices based on the read allocation permission. At this time, the now read allocation permission is stored as the latest allocation permission into the history register in the FIFO manner. It should be understood that a portion of the past allocation permission stored in the history register may be varied by the respective devices.

With employment of such an arrangement, the arbiter controller can accept the allocation requests issued from the respective devices in the time-to-time manner, while maintaining the flexible characteristics thereof. Therefore, the arbiter controller can effectively use the bus.

In the above-explained conventional bus control apparatus, as the high-order bit of the address of the arbiter memory, 4 sets of allocation permissions provided immediately close to each other are used, and further, as the lower-order bit of the address of the arbiter memory, the present allocation requests (request bits) issued from the respective devices are used to select the allocation permission. In this arbiter memory, the allocation permission algorithm is stored, whereas the 4 sets of allocation permissions are stored into the history register. In this specification, the expression "4 sets of allocation permissions immediately provided with each other" implies such a record that an allocation is permitted one time to each of these devices. As a consequence, a total number of devices connectable to a bus would be limited to a bit number of an address of an arbiter memory. Accordingly, in the above-explained conventional bus control apparatus, the total bit number of the history register is required by such a number defined by adding the required bit number to 2-power of a total number of these devices. It should be noted that the required bit number is equal to the total number of these devices.

Therefore, in order that a user may freely add any devices to a computer system, namely higher flexibility, it is required to employ such an arbiter memory having a bit number equal to a total number of devices connectable to a bus. Furthermore, extra storage regions of a history register would be increased in an exponential manner every time even one device is additionally introduced. For example, when 8 sets of devices in maximum are designed to be connectable with a bus, the history register would require the storage regions capable of storing 72-bit data, and the address of the arbiter memory would become 8 bits, namely 256 words. In such a case, even when this user connects only 4 sets of devices to the bus, the necessary allocation permission algorithm must be previously stored in the arbiter memory, assuming now that 8 sets of devices are in principle connected to this bus. Moreover, the address constructed of 256 words, namely 8-bit address must be continuously supplied to this arbiter memory, resulting in lowering of the efficiency.

Also, in the above-explained conventional bus control apparatus, since the priority-order allocation permission algorithm is employed as the allocation permission algorithm, the priority orders of the devices are previously defined in the system design stage. As a consequence, when a plurality of devices are actually mounted on the bus 7, the priority orders for the respective devices must be predicted by the user so as to actually connect these devices to this bus 7. However, even when the use condition is changed after the devices have been actually mounted to the bus, and a total number of allocation requests issued from a device having a low priority order is larger than a total number of allocation requests issued from another device having a higher priority order, the priority orders of these devices are not changed. To avoid this difficulty, the connections of the devices to the bus must be changed in order that the priority order of such a device whose allocation request number is increased is changed. This may cause cumbersome operations.

Also, since the round robin algorithm is employed as the allocation permission algorithm, such a specific actual case problem may happen to occur. That is, a priority order of such a device which has firstly issued an allocation request would become a top priority during the past 4 allocation permissions.

Moreover, in the above-described conventional bus control apparatus, the bus allocation permission is carried out by simply considering only the past allocation permission history and the present allocation request. As a consequence, in such a case that the allocation requests issued from the respective devices are rapidly varied and/or a certain device is replaced by another device, there is a further problem that this conventional bus control apparatus cannot immediately respond to these sudden changes in the allocation requests and the device connections.

SUMMARY OF THE INVENTION

The present invention has been made to solve the above-described various problems of the conventional bus control apparatus, and therefore, has an object to provide a bus control method, a bus control apparatus, a computer system, and also a storage medium for storing a bus control program, capable of immediately accepting various changes in allocation requests issued from various data input/output means.

Another object of the present invention is to provide a bus control method, and a bus control apparatus, capable of effectively processing bus allocation requests with a simple structure and without a cumbersome operation.

A further object of the present invention is to provide a bus control method and a bus control apparatus, capable of increasing a utilization efficiency of a bus to which a plurality of data input/output means are connected.

To achieve the above-described objects, a bus control method, according to a first aspect of the present invention, is featured by comprising the steps of:

counting numbers of bus allocation requests issued from a plurality of plural data input/output means within a predetermined time period;

measuring waiting time defined by that after the bus allocation request is issued from each of the plural data input/output means, the bus allocation request is allowed; and allocating such that at least one bus is allocated to which data input/output means for having issued the bus allocation request based upon at least one of the counted bus allocation request number and the measured waiting time, while the plurality of data input/output means are connected to the at least one bus.

To achieve the above-described objects, a bus control method, according to a second aspect of the present invention, is featured by comprising the steps of:

counting numbers of bus allocation requests issued from a plurality of plural data input/output means within a predetermined time period;

measuring waiting time defined by that after the bus allocation request is issued from each of the plural data input/output means, and until the bus allocation request is allowed; and allocating such that at least one bus is allocated to which data input/output means for having issued the bus allocation request based upon both the counted bus allocation request number and the measured waiting time, while the plurality of data input/output means are connected to the at least one bus.

Also, in the bus control method according to the first and second aspects of the present invention, another bus control method is featured by that at least one of the allocation request number counting step and the waiting time measuring step is arbitrarily carried out.

Also, in the bus control method according to the first and second aspects of the present invention, another bus control method is featured by that the predetermined time period is variable.

Also, in the bus control method according to the first and second aspects of the present invention, another us control method is featured by that the bus allocation executed in the bus allocating step is temporarily variable.

Also, in the bus control method according to the first and second aspects of the present invention, another bus control method is featured by further comprising the steps of applying, in advance, priority orders with respect to bus allocation permissions to the plurality of data input/output means; and controlling the bus allocation to which data input/output means based upon not only one of the counted bus allocation request numbers and the measured waiting time, but also the applied priority orders.

To achieve the above-described objects of the present invention, a bus control system, according to a third aspect of the present invention, is featured by comprising:

a plurality of data input/output means connected to at least one bus, for issuing a plurality of bus allocation requests;

a plurality of counting means for counting numbers of the bus allocation requests issued from the plurality of data input/output means within a predetermined time period; and bus allocation control means for controlling such that the bus is allocated to which data input/output means based upon at least the counted bus allocation request numbers obtained by the plurality counting means.

To achieve the above-described objects of the present invention, a bus control system, according to a fourth aspect of the present invention, is featured by comprising:

a plurality of data input/output means connected to at least one bus, for issuing a plurality of bus allocation requests a plurality of waiting time measuring circuits for measuring a plurality of waiting time defined by that after the plurality of bus allocation requests are issued from the plurality of data input/output means, and until the bus allocation requests are allowed; and bus allocation control means for controlling such that the bus is allowed to which data input/output means based upon at least the measured waiting time obtained form the plurality of waiting time measuring circuits.

Also, in the bus control system according to the third and fourth aspects of the present invention, another bus control system is featured by further comprising:

protocol selection mode producing means for producing protocol selection mode data indicative of a selected bus allocation protocol; and protocol control means for comparing the plurality of counted bus allocation request numbers with each other to produce sequence data, and also for producing bus allocation permission data based on both the sequence data and the protocol selection mode data, whereby:

the bus allocation control means controls the bus allocation to the data input/output means in response to the bus allocation permission data.

Also, in the bus control system according to the third and fourth aspects of the present invention, another bus control system is featured by that the protocol selection mode producing means is a protocol selection mode register for storing thereinto the protocol selection mode data; and the protocol selection mode data is capable of selecting a proper protocol.

Also, in the bus control system according to the third and fourth aspects of the present invention, another bus control system is featured by that the protocol control means includes:

a comparing circuit for comparing the plurality of counted bus allocation request numbers with each other, which are obtained from the plurality of counting means; and an allocation protocol data producing circuit for processing the compared bus allocation request numbers and the protocol selection mode data to thereby produce allocation protocol data.

Also, in the bus control system according to the third and fourth aspects of the present invention, another bus control system is featured by that the bus allocation control means includes at least:

an allocation request judging circuit for judging as to which protocol is required in response to the bus allocation requests issued from the plural data input/output means to thereby produce a protocol selection signal;

an allocation protocol producing circuit for producing a bus allocation protocol in response to the protocol selection signal; and a bus allocation permission data producing circuit for producing the bus allocation permission data based upon the bus allocation protocol, whereby:

the bus allocation control means controls the bus allocation to the data input/output means in response to the bus allocation permission data.

Also, in the bus control system according to the third and fourth aspects of the present invention, another bus control system is featured by that a protocol update cycle setting register for previously storing thereinto a protocol update cycle value; and a timer for starting a time clock counting operation when the protocol update cycle value is loaded on the timer, and also for supplying an overflow signal to the plurality of counting means when the time clock counting operation reaches a preselected count value.

Also, in the bus control system according to the third and fourth aspects of the present invention, another bus control system is featured by further comprising:

priority order applying means for previously applying priority orders with respect to bus allocation permissions to the plurality of data input/output means; whereby:

the bus allocation control means controls the bus allocation permissions based on not only the counted bus allocation request numbers, but also the applied priority orders.

Also, in the bus control system according to the third and fourth aspects of the present invention, another bus control system is featured by that the data input/output means are selected from a memory, a display, a keyboard, a sound board, a modem, a graphic board, and a LAN (local area network) board.

Furthermore, to achieve the above-explained objects, a computer system, according to a fifth aspect of the present invention, is featured by comprising:

at least one bus;

a plurality of data input/output means connected to the at least one bus, for issuing a plurality of bus allocation requests;

a bus control apparatus including: a plurality of counting means for counting numbers of the bus allocation requests issued from the plurality of data input/output means within a predetermined time period; and bus allocation control means for controlling such that the bus is allocated to which data input/output means based upon at least the counted bus allocation request numbers obtained by the plural counting means; and a CPU (central processing unit) for controlling at least the bus allocation control means.

Furthermore, to achieve the above-explained objects, a computer system, according to a sixth aspect of the present invention, is featured by comprising:

at least one bus;

a plurality of data input/output means connected to the at least one bus, for issuing a plurality of bus allocation requests;

a bus control apparatus including: a plurality of waiting time measuring circuits for measuring a plurality of waiting time defined by that after the plurality of bus allocation requests are issued from the plurality of data input/output means, and until the bus allocation requests are allowed; and bus allocation control means for controlling such that the bus is allocated to which data input/output means based upon at least the measured waiting time obtained from the plurality of waiting time measuring circuits; and a CPU for controlling at least the bus allocation control means.

To achieve the above-mentioned objects, a storage medium, according to a seventh aspect of the present invention, is featured by such a storage medium for storing a bus control program used to cause a computer to execute bus controlling steps of:

counting numbers of bus allocation requests issued from a plurality of plural data input/output means within a predetermined time period;

measuring waiting time defined by that after the bus allocation request is issued from each of the plural data input/output means, and until the bus allocation request is allowed; and allocating such that at least one bus is allocated to which data input/output means for having issued the bus allocation request based upon at least one of the counted bus allocation request number and the measured waiting time, while the plurality of data input/output means are connected to the at least one bus.

To achieve the above-mentioned objects, a storage medium, according to an eighth aspect of the present invention, is featured by such a storage medium for storing a bus control program used to cause a computer to execute bus controlling steps of:

counting numbers of bus allocation requests issued from a plurality of plural data input/output means within a predetermined time period;

measuring waiting time defined by that after the bus allocation request is issued from each of the plural data input/output means, and until the bus allocation request is allowed; and allocating such that at least one bus is allocated to which data input/output means for having issued the bus allocation request based upon both the counted bus allocation request number and the measured waiting time, the plurality of data input/output means being connected to the at least one bus.

As previously described in detail, in accordance with the present invention, the bus control system can be constituted by employing the simple arrangement, and further can be operated in high efficiencies. Moreover, the bus control system of this invention can be quickly operated with high flexibility even when the various allocation requests are issued from the respective data input/output means. As a result, the use efficiency of the bus can be increased.

BRIEF DESCRIPTION OF THE DRAWINGS

The above and other objects, advantages and features of the present invention will be more apparent from the following description taken in conjunction with the accompanying drawings in which:

FIGS. 3(1)–3(3) are explanatory diagrams for explaining an example of a priority order applying operation based on an order-fixed allocation protocol;

FIGS. 4(1)–4(4) are explanatory diagrams for explaining an example of a priority order applying operation based upon an order-varied allocation protocol;

DESCRIPTION OF THE PREFERRED EMBODIMENTS

Referring to drawings, various preferred embodiments of the present invention will be described in detail with employment of concrete examples.

Overview of First Embodiment

Figure 1:
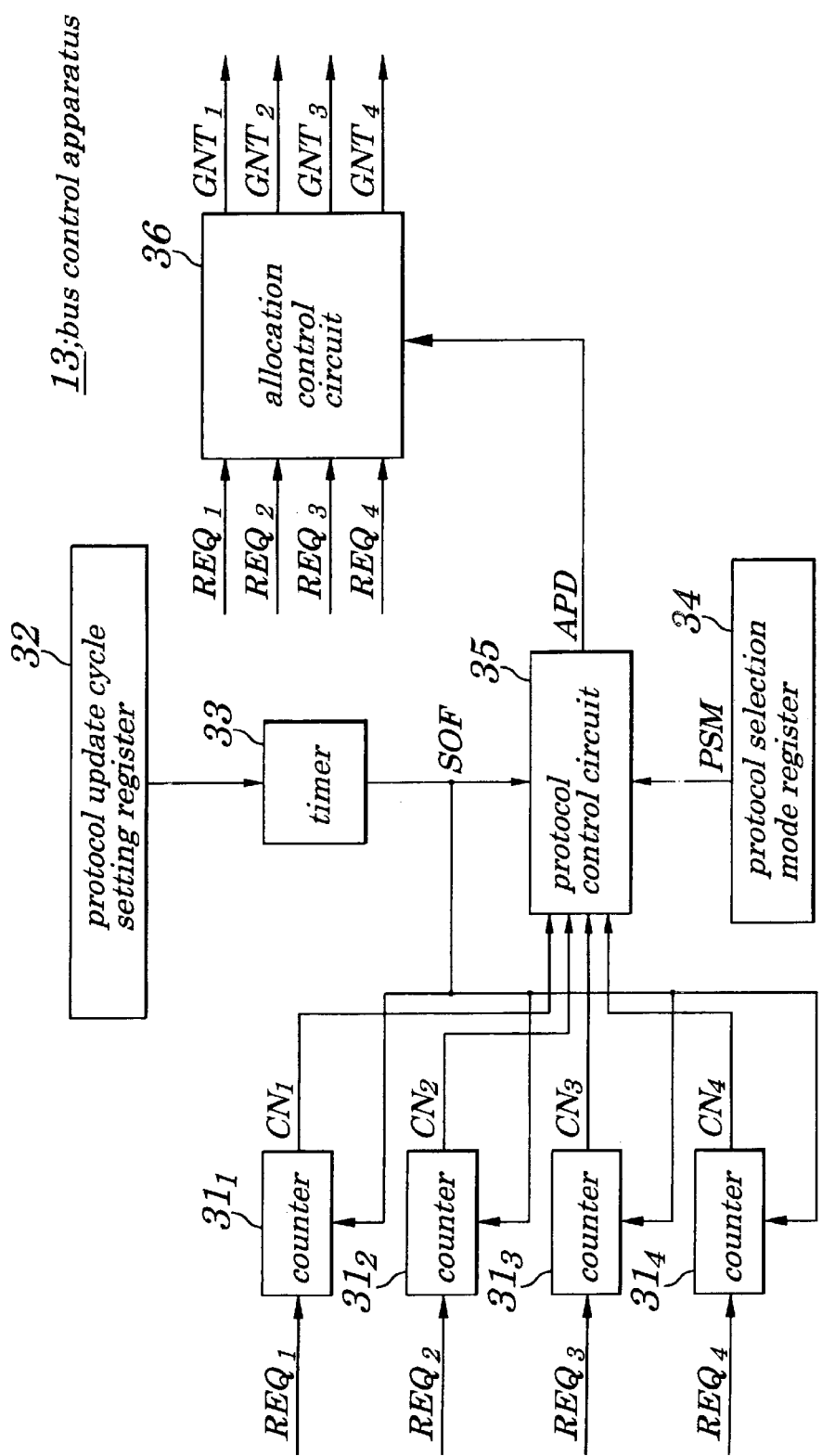
FIG. 1 is a schematic block diagram for showing an internal arrangement of a bus control apparatus according to a first embodiment of the present invention.
Figure 2:
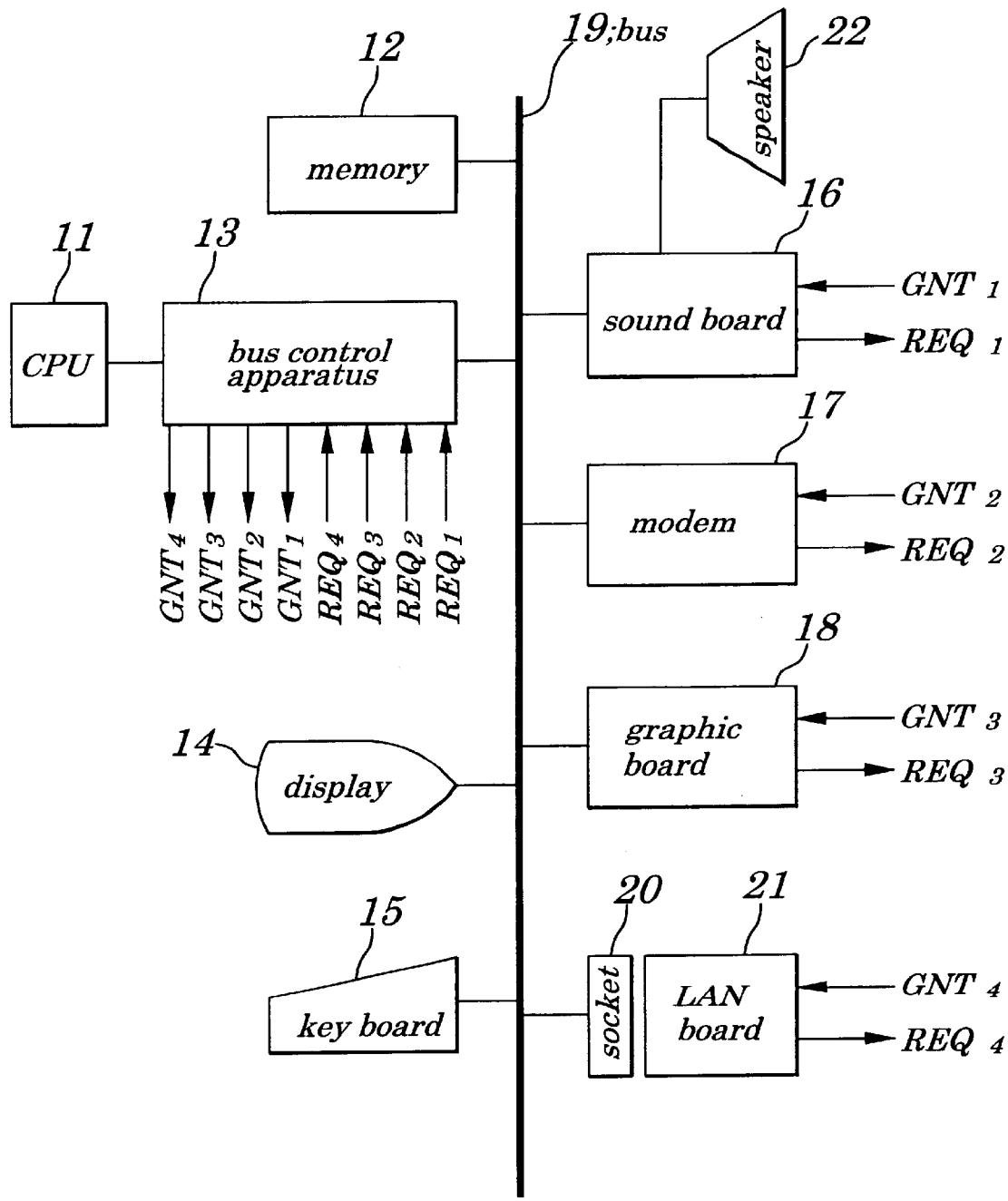
FIG. 2 schematically shows an internal arrangement of a computer system to which the bus control apparatus of the first embodiment is applied.

FIG. 1 is a schematic block diagram for showing an internal arrangement of a bus control apparatus according to a first embodiment of the present invention. FIG. 2 schematically shows an internal arrangement of a computer system to which the bus control apparatus of the first embodiment is applied.

As indicated in FIG. 2, this computer system is mainly arranged by a CPU (central processing unit) 11, a memory 12, a bus control apparatus 13, a display 14, a keyboard 15, a sound board 16, a modem 17, and a graphic board 18.

The CPU 11 is connected to the bus control apparatus 13. The memory 12, the bus control apparatus 13, the display 14, the keyboard 15, the sound board 16, the modem 17, and the graphic board 18 are connected via a bus 19 to each other. Also, a socket 20 is mounted with this bus 19, so that, for example, a local area network (LAN) board 21 is connectable with the bus 19 via this socket 20. It should be understood that the above-described sound board 16, modem 17, graphic board 18, and LAN board 21 will be collectively referred to as "data input/output means" in the below-mentioned specification, if required.

Functions of Arrangements in First Embodiment

When allocation request signals $REQ_1$ to $REQ_4$ for requesting an allocation of the bus 19 are supplied to the bus control apparatus 13 in order that one data input/output means accesses via the bus 19 the memory 19, or another data input/output means, this bus control apparatus 13 determines which data input/output means is allowed to be allocated to the bus 19, and then supplies any one of allocation permission signals $GNT_1$ to $GNT_4$ to the relevant data input/output means.

The display 14 is constructed of either a CRT display or a liquid crystal (LCD) display. This display 14 may display characters, figures, or patterns produced by the graphic board 18 under control of the CPU 11. The keyboard 15 is arranged by various sorts of keys such as a ten keyboard, and a function key, and also buttons. Under control of the CPU 11, the sound board 16 accesses the memory 12 via the bus 19 to produce a music signal based upon music data stored in the memory 12, and then reproduces music sounds from a speaker 22.

Also, under control of the CPU 11, the modem 17 accesses the memory 12 via the bus 19 so as to transmit modulation data via a telephone line (not shown), and store demodulation data into the memory 12. The modulation data is obtained by modulating the data stored in this memory 12, whereas the demodulation data is obtained by demodulating the modulation data which is transmitted from an external device via the telephone line.

Also, under control of the CPU 11, the graphic board 18 accesses the memory 12 via the bus 19 so as to produce a figure, or a pattern based upon figure data stored in the memory 12, and then to cause the display 14 to display thereon this produced figure. The LAN board 21 is connected via a cable of another computer system (not shown in detail). Under control of the CPU 11, this LAN board 21 accesses the memory 12 via the bus 19 in order to transmit the data stored in the memory 12 via a cable (not shown either) to another computer system. Furthermore, this LAN board 21 receives the data which is transmitted via the cable from another computer system, and then stores this received data into the memory 12 under control of the CPU 11.

It should also be noted that the above-explained data input/output means are not limited to the above-described sound board 16, modem 17, graphic board 18, and LAN board 21, but may be alternatively realized by, for example, a memory control circuit. Moreover, a total number of these data input/output means is not limited to four sets of these devices, as shown in FIG. 2.

Internal Arrangement of Bus Control Apparatus 13

As illustrated in FIG. 1, the bus control apparatus 13 is mainly arranged by counters $31_1$ to $31_4$, a protocol update cycle setting register 32, a protocol control circuit 35, and an allocation control circuit 36.

The counters $31_1$ to $31_4$ are provided in correspondence with the sound board 16, the modem 17, the graphic board 17, and the LAN board 21. These counters $31_1$ to $31_4$ count the number of pulse-shaped allocation request signals $REQ_1$ to $REQ_4$ supplied from the corresponding data input/output means, and thereafter supply counted values $CN_1$ to $CN_4$ to the protocol control circuit 35. A protocol update cycle value is set by the CPU 11 to the protocol update cycle setting register 32. A protocol update cycle value corresponds to a clock number of a system clock which should be counted by the timer 33. This system clock indicates that a protocol related to an allocation permission of the bus 19 is updated in which cycle. Based on this protocol, when which condition is satisfied, the bus 19 is allowed to be allocated to such a data input/output means while having a top priority. This protocol update cycle value is arbitrarily updated by the CPU 11 within a range of 20 clocks to 1,000 clocks. The timer 33 count up the system clocks from 0 every 1 system clock since the protocol update cycle value set to the protocol update cycle setting register 32 is loaded to this timer 33. When this counted value becomes equal to the loaded protocol update cycle value, the counter 33 supplies an overflow signal SOF to the counters $31_1$ to $31_4$, and also the protocol control circuit 35, and furthermore this counted value is reset to 0.

In the protocol selection mode register 34, a protocol selection mode PSM is set by the CPU 11. This protocol selection mode PSM includes data capable of instructing which protocol should be selected. As the protocol, there are provided an order-fixed allocation protocol and an order-varied allocation protocol, and the like.

Priority Order Allocation Protocols

The above-described order-fixed allocation protocol corresponds to such a protocol that while priority orders are previously applied to the data input/output means, the allocation of the bus 19 is permitted based upon the relevant priority order every time a preselected time period has passed irrespective to differences in the counted values $CN_1$ to $CN_4$. It should also be noted that concretely speaking, the priority orders previously applied to the data input/output means imply such priority orders which are applied to slots on which the respective data input/output means of the computer system should be mounted. Also, the priority orders may be used as identification numbers capable of identifying the respective data input/output means. As a consequence, in such a case that a first (top) priority order is applied to the sound board 16 shown in FIG. 2, this sound board 16 is mounted on such a slot to which this first priority order is applied among a plurality of slots of the computer system. This priority order application may be similarly applied to other data input/output means.

As illustrated in FIG. 3, as the order-fixed allocation protocol, there are provided a perfect type order-fixed allocation protocol, an order rotation type order-fixed allocation protocol, and an order emphasis type order-fixed allocation protocol. In this drawing, reference numerals ① to ④ indicate priority orders and identification numbers, which are applied to the data input/output means. In this first embodiment, the higher priority order represent the younger (smaller) numbers, while the first priority order is set as reference numeral (1).

In this case, as shown in FIG. 3(1), the perfect type order-fixed allocation protocol corresponds to such a protocol that an allocation of the bus 19 is allowed based only upon priority orders continuously applied to the data input/output means. This perfect type order-fixed allocation protocol is properly employed in such a case that although a utilization condition of the bus 19 is not reflected to this protocol, the priority orders of these data input/output means are required to be emphasized, rather than the utilization condition of the bus 19. Also, as shown in FIG. 3(2), the order rotation type order-fixed allocation protocol corresponds to such a protocol that data input/output means which should be allocated with the priority in a time period based upon the priority orders applied to the respective data input/output means are determined in a rotation manner. This order rotation type order-fixed allocation protocol is properly employed in such a case that while there are only small differences in the priority orders applied to the respective data input/output means and also the utilization conditions of the bus 19, the original (beginning) priority orders are not so highly emphasized. Furthermore, as indicated in FIG. 3(3), the order emphasis type order-fixed allocation protocol corresponds to a protocol such that although a first priority order is determined by the rotation manner within one time period based on the priority orders applied to the respective data input/output means every time period, a second priority order and the subsequent priority orders within this time period are determined based on the previously applied priority orders. This order emphasis type order-fixed allocation protocol is properly employed in such a case that the original priority orders of the respective data input/output means are emphasized, as compared with the order rotation type order-fixed allocation protocol.

The above-explained order-fixed allocation protocols may be used in such a case that the utilization condition of the bus 19 by the respective data input/output means is not so largely changed from the actual bus utilization condition under which the priority orders of the respective data input/output means must be changed. The first-mentioned bus utilization condition is originally predicted by the user when the computer system is installed.

In contrast to the above-explained order-fixed allocation protocol, the above-described order-varied allocation protocols may be used in such a case that the utilization condition of the bus 19 by the respective data input/output means is so largely changed from the actual bus utilization condition under which the priority orders of the respective data input/output means must be changed. The first-mentioned bus utilization condition is originally predicted by the user when the computer system is installed. Alternatively, the order-varied allocation protocol may be employed in such a case that data input/output means such as the LAN board 21 shown in FIG. 2 is newly added.

The above-described order-varied allocation protocol corresponds to such a protocol that while priority orders are previously applied to the data input/output means, the allocation of the bus 19 is permitted based upon the relevant priority order every time a preselected time period has passed based upon differences in the counted values $CN_1$ to $CN_4$. As illustrated in FIG. 4, as the order-varied allocation protocol, there are provided a perfect type order-varied allocation protocol, an order rotation type order-varied allocation protocol, and an order emphasis type order-varied allocation protocol, and further, a composite type order-varied allocation protocol. In this drawing, reference numerals ① to ④ indicate priority orders and identification numbers, which are applied to the data input/output means, similar to those of FIG. 3. In this first embodiment, the higher priority order represent the younger (smaller) numbers, while the first priority order is set as reference numeral (1). Also, in FIG. 4, the following assumption is made. That is, the counted values $CN_1$ to $CN_4$ are ordered from the higher order of $CN_2$, $CN_4$, $CN_1$, and $CN_3$ in a certain protocol update cycle.

In this case, as shown in FIG. 4(1), the perfect type order-varied allocation protocol corresponds to such a protocol that an allocation of the bus 19 is allowed based only upon the values of the counted values $CN_1$ to $CN_4$, while neglecting the priority orders which are originally applied to the respect data input/output means. The utilization condition of the bus 19 may be highly reflected to this perfect type order-varied application protocol. This protocol is properly employed in such a case that a utilization condition of the bus 19 happens to occur, which could not be completely predicted by the user when the computer system is installed. Also, as shown in FIG. 4(2), the order rotation type order-varied allocation protocol corresponds to such a protocol that data input/output means which should be allocated with the priority in an odd-numbered time period based upon the priority orders applied to the respective data input/output means are determined in a rotation manner (note that data input/output means having maximum counted value CN is not allocated to first order), whereas the allocation of the bus 19 is performed based only on a difference among the values of the counted values $CN_1$ to $CN_4$ in an even-numbered time period, so that the allocation of the bus 19 is permitted. This order rotation type order-varied allocation protocol is properly employed in such a case that while there are only small differences in the priority orders applied to the respective data input/output means, the original (beginning) priority orders are not so highly emphasized, although the priority orders of the respective data input/output means are required to be changed.

Furthermore, as indicated in FIG. 4(3), the order emphasis type order-varied allocation protocol corresponds to a protocol such that a first priority order is determined by the rotation manner within an odd-numbered time period based on the priority orders applied to the respective data input/output means in the odd-numbered time periods (except for such a data input/output means having a maximum counted value CN), and also a second priority and the succeeding priority orders within this odd-numbered time period are determined based only upon previously applied priority orders, and moreover, priority orders are determined based only on differences in the values of these counted values $CN_1$ to $CN_4$ in odd-numbered time periods, so that the allocation of the bus 19 is allowed. This protocol is properly employed in such a case that although the priority orders of the respective data input/output means are required to be changed, the original priority orders of the respective data input/output means are emphasized, as compared with the order rotation type order-varied allocation protocol.

The composite type order-varied allocation protocol corresponds to such a protocol that, as represented in FIG. 4(4), a first order within an odd-numbered time period is determined in a rotation manner based upon the priority orders applied to the respective data input/output means (except for such a data input/output means having a maximum count value CN) in the odd-numbered time periods, and also a second order and the succeeding orders thereof are determined in this odd-numbered time period based only upon differences in the counted values $CN_1$ to $CN_4$, and further the priority orders in the even-numbered time periods are determined based only differences in values of the counted values $CN_1$ to $CN_4$, so that the allocation of the bus 19 is allowed. This composite type protocol is properly used in such a case that while the priority orders of the respective data input/output means are maintained, the utilization condition of the bus 19 is reflected at maximum.

In the above explanation, for the sake of a simple explanation, all of the allocation request signals $REQ_1$ to $REQ_4$ are continuously supplied within the same time period. However, in the actual case, a total number of these supplied allocation request signals REQ is different, depending upon the time period. In such an actual case, the orders of allocation request signals REQ which are located lower than the not-supplied allocation request signal REQ are sequentially advanced. For instance, in the case that the allocation request signal $REQ_2$ is not supplied in a first time period (left end) of FIG. 3(1), the allocation request signals in this first time period own priority orders in this order of ①, ③, and ④.

Internal Arrangements of Protocol Control Circuit 35/Allocation Control Circuit 36

Figure 5:
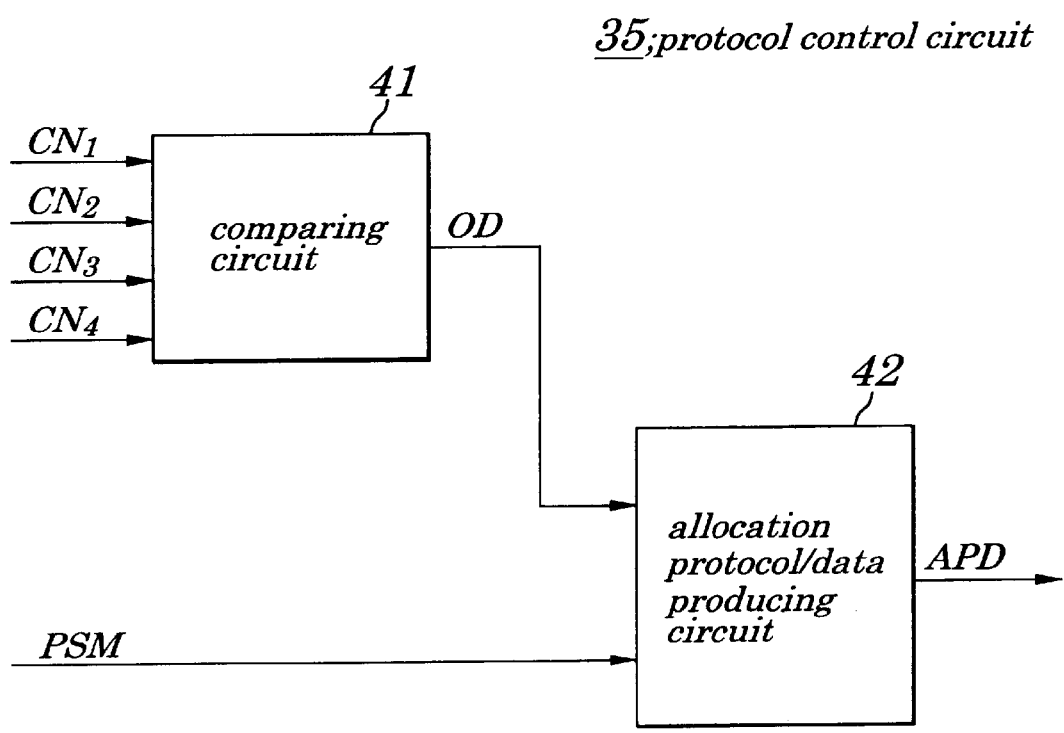
FIG. 5 is a schematic block diagram for indicating an internal arrangement of a protocol control circuit employed in the bus control apparatus according to the first embodiment.

As indicated in FIG. 5, the protocol control circuit 35 employed in the first bus control apparatus 13 of FIG. 1 is constituted by a comparing circuit 41 and an allocation protocol/data producing circuit 42. The comparing circuit 41 compares the counted values $CN_1$ to $CN_4$ with each other, which are supplied from the counters $31_1$ to $31_4$ every time the protocol update cycle is executed so as to rearrange these counted values from the larger value to the smaller value. Then, this comparing circuit 41 produces sequence data "OD" indicative of a sequence of these rearranged counted values CN, namely this sequence data OD representative of a sequence of identification numbers. The allocation protocol/data producing circuit 42 produces allocation protocol/data "APD" based upon both the sequence data OD, and the protocol selection mode PSM loaded from the protocol selection mode register 34, and then supplies this allocation protocol data APD to the allocation control circuit 36.

Figure 6:
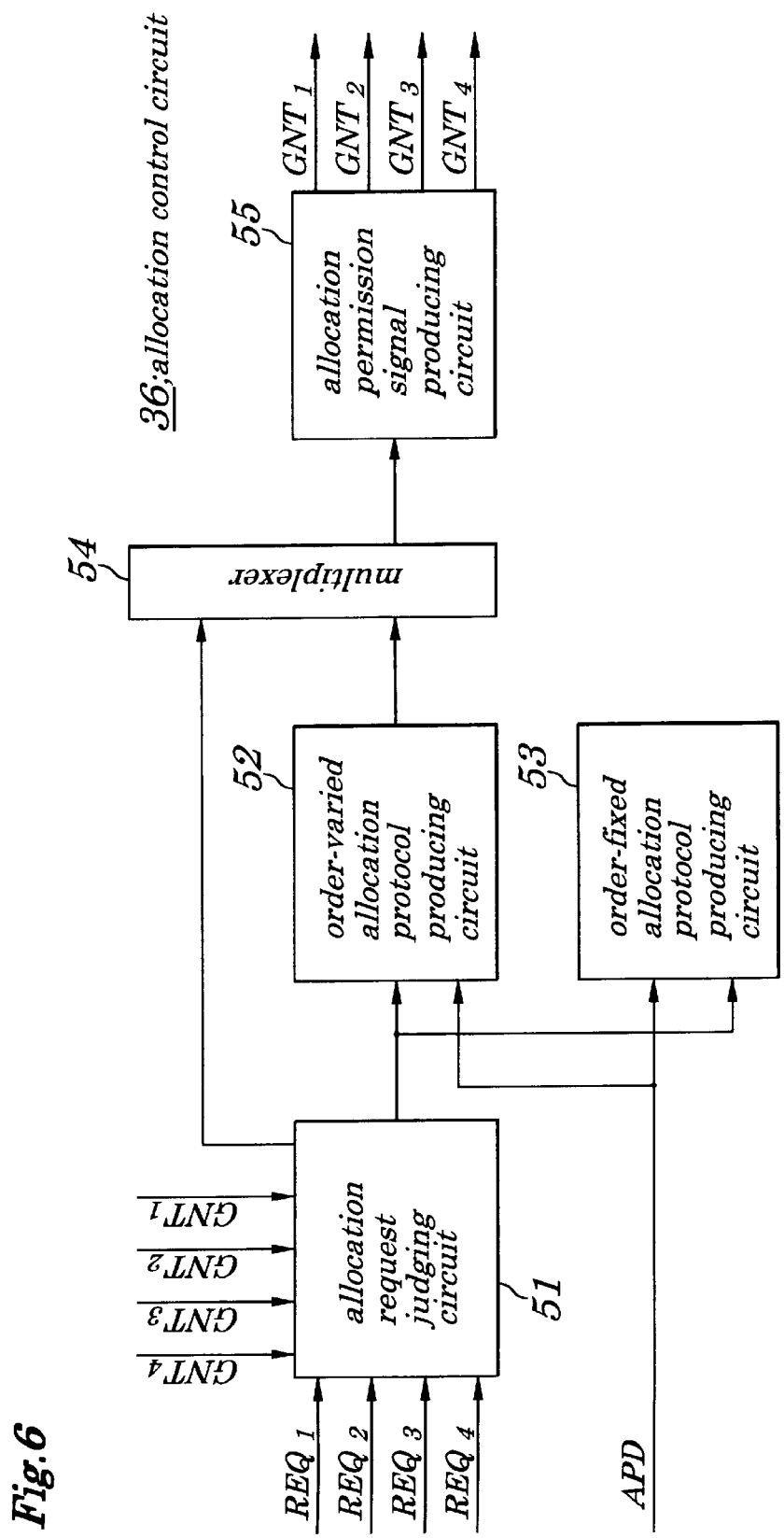
FIG. 6 is a schematic block diagram for representing an internal arrangement of an allocation control circuit employed in the bus control apparatus according to the first embodiment.

As indicated in FIG. 6, on the other hand, the allocation control circuit 36 is arranged by an allocation request judging circuit 51, an order-varied allocation protocol producing circuit 52, an order-fixed allocation protocol producing circuit 53, a multiplexer 54, and an allocation permission signal producing circuit 55.

The allocation request judging circuit 51 judges as to how many the allocation request signals $REQ_1$ to $REQ_4$ are supplied within a preselected time period. When only one allocation request signal REQ is merely supplied, this allocation request judging circuit 51 supplies an identification number to the multiplexer 54. This identification number is applied to such a data input/output means which has supplied this allocation request signal REQ. Also, in the case that a plurality of allocation request signals REQs are supplied, the allocation request judging circuit 51 supplies the identification numbers corresponding thereto to both the order-varied allocation protocol producing circuit 52 and the order-fixed allocation protocol producing circuit 53. It should be understood that since the allocation request judging circuit 51 cannot allow the double allocations of the bus 19 under such a condition that the allocation permission signal GNT has already been outputted to any one of these data input/output means and therefore this data input/output means occupies the bus 19, the allocation request judging circuit 51 will not respond even if the allocation request signals REQ are supplied from other data input/output means.

The order-varied allocation protocol producing circuit 52 contains a storage unit for previously storing thereinto the above-explained perfect type order-varied allocation protocol, order emphasis type order-varied allocation protocol, order rotation type order-varied allocation protocol, and composite type order-varied allocation protocol. When such a protocol selection mode PSM which constitutes the supplied allocation protocol data APD instructs an allocation determined by any of the above-explained order-varied allocation protocols, this order-varied allocation protocol producing circuit 52 reads out the instructed order-varied allocation protocol from the storage unit. Then, the order-varied allocation protocol producing circuit 52 determines such an identification number having a top priority order within the relevant time period based upon both the read order-varied allocation protocol and the sequence data OD for constituting the supplied allocation protocol data APD among the supplied plural identification numbers of the data input/output means. Thereafter, this order-varied allocation protocol producing circuit 52 supplies this determined identification number to the multiplexer 54.

The order-fixed allocation protocol producing circuit 53 contains a storage unit for previously storing thereinto the above-explained perfect type order-fixed allocation protocol, order emphasis type order-fixed allocation protocol, and order rotation type order-fixed allocation protocol. When such a protocol selection mode PSM which constitutes the supplied allocation protocol data APD instructs an allocation determined by any of the above-explained order-fixed allocation protocols, this order-varied allocation protocol producing circuit 53 reads out the instructed order-fixed allocation protocol from the storage unit. Then, the order-fixed allocation protocol producing circuit 53 determines such an identification number having a top priority order within the relevant time period based upon both the read order-fixed allocation protocol and the sequence data OD for constituting the supplied allocation protocol data APD among the supplied plural identification numbers of the data input/output means. Thereafter, this order-fixed allocation protocol producing circuit 53 supplies this determined identification number to the multiplexer 54.

The multiplexer 54 sequentially furnishes to the allocation signal producing circuit 55 at preselected timing, such identification numbers which are successively supplied from the allocation request judging circuit 51, the order-varied allocation protocol producing circuit 52, or the order-fixed allocation protocol producing circuit 53.

The allocation permission signal producing circuit 55 temporarily produces the allocation permission signal GNT corresponding to the supplied identification number, and then supplies this produced allocation permission signal GNT to the respective data input/output means at preselected timing.

Overall Operation of Computer System Using First Bus Control Apparatus

Next, overall operations of the computer system with employment of the above-explained arrangement will be described with reference to FIG. 1 to FIG. 7.

First, the following initial condition is assumed. That is to say, a user newly purchases this computer system, and sequentially mounts the sound board 16, the modem 17, and the graphic board 18 on the slots to which the first priority order to the third priority order have been applied, for instance, as illustrated in FIG. 2. Also, the user electrically connects the display 14 and the keyboard 15 via the bus 19 to this computer system. Thereafter, when the user turns ON the power supply of this computer system, the CPU 11 commences the control operations of the various structural elements employed in this computer system, for instance, the CPU 11 reads the operation system (OS) software from the memory 12 via the bus control apparatus 13 so as to initiate this computer system.

In this case, the CPU 11 supplies both the protocol update cycle value and the protocol selection mode PSM to the bus control apparatus 13. In the beginning, it is so assumed that 500 clocks are supplied as the initial value of the protocol update cycle value, and also the perfect type order-fixed allocation protocol shown in FIG. 3(1) is supplied as the protocol selection mode PSM. As a consequence, 500 clocks are set as the protocol update cycle value into the protocol update cycle setting register 32, and furthermore, the perfect type order-fixed allocation protocol is set as the protocol selection mode PSM into the protocol selection mode register 34.

Bus Control Operation by Bus Control Apparatus 13

Under such a condition, the bus control apparatus 13 performs the below-mentioned operations:

First of all, since the protocol update cycle value (in this case, 500 clocks are now loaded) set in the protocol update cycle setting register 32 is loaded, the timer 33 counts up the system clocks every 1 clock from zero. When the counted value becomes equal to the 500 clocks, this timer 33 supplies the overflow signal SOF to the counters $31_1$ to $31_3$, and also the protocol control circuit 35. Also, this count value is reset to zero. The counters $31_1$ to $31_3$ count the numbers of allocation request signals $REQ_1$ to $REQ_3$ supplied from the corresponding data input/output means, and then supply the counted values $CN_1$ to $CN_3$ to the protocol control circuit 35. It is now assumed that these counted values $CN_1$ to $CN_3$ own the largest value $CN_2$, the medium value $CN_1$, and the smallest value $CN_3$ in a certain protocol update cycle (in this case, a time period of 500 clocks). It should also be noted that in this case, since the corresponding data input/output means is not connected to the computer system via the bus 19, the relevant counter 314 is not operated.

As a consequence, in this protocol update cycle, the comparing circuit 41 of the protocol control circuit 35 sequentially compares the counted values $CN_1$ to $CN_3$ supplied from the counters $31_1$ to $31_3$ with each other so as to rearrange these counted values $CN_1$ to $CN_3$ in this order of $CN_2$, $CN_1$, and $CN_3$, namely the larger value order. Then, this comparing circuit 41 produces the sequence data OD indicative of the sequence of the rearranged counted values CN, namely the sequence of identification numbers, i.e., ②, ①, and ③ in this case.

As a result, the allocation protocol/data producing circuit 42 produces the allocation protocol data APD based upon both the sequence data OD, and the protocol selection mode PSM loaded from the protocol selection mode register 34. Then, this allocation protocol data producing circuit 42 supplies the produced allocation protocol data APD to the allocation control circuit 36. In this case, since the perfect type order-fixed allocation protocol is set as the protocol selection mode PSM, this allocation protocol data producing circuit 42 produces the allocation protocol data APD based upon both the sequence data OD indicative of ②, ①, ③, and the protocol selection mode PSM representative of the perfect type order-fixed allocation protocol. Then, the allocation protocol data producing circuit 42 supplies this allocation protocol data APD to the allocation control circuit 36.

Allocation Control by Allocation Control Circuit 36

Figure 7:
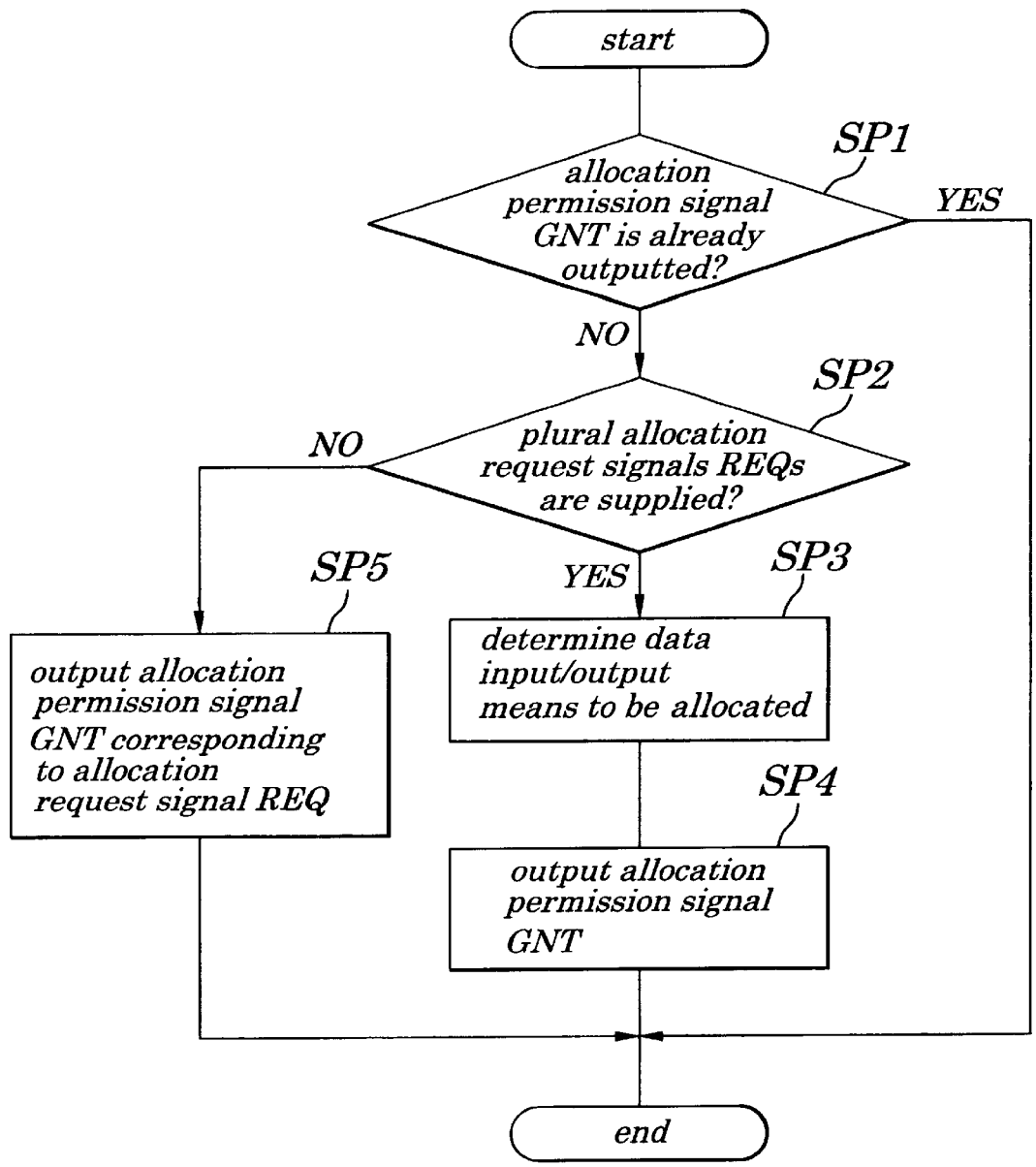
FIG. 7 is a flow chart for describing operation of the allocation control circuit shown in FIG. 6.

Referring now to a flowchart indicated in FIG. 7, a description will be made of allocation control operations by the allocation control circuit 36.

First, when any one of the above-described allocation request signals $REQ_1$ to $REQ_3$ is supplied from the relevant data input/output means such as the modem 17, the allocation control operation by the allocation request judging circuit 51 is advance to a step SP1 of this flow chart. At this step SP1, the allocation request judging circuit 51 judges as to whether or not any one of the allocation permission signals $GNT_1$ to $GNT_3$ has already been outputted to the data input/output means corresponding thereto. When this judgment result is "YES" (namely, allocation permission signal GNT has already been outputted), since the allocation control circuit 36 cannot again allow other data input/output means to allocate the bus 19, this allocation control process is accomplished.

To the contrary, when the judgment result is "NO" at the above step SP1, namely in such a case that the allocation permission signal GNT is not outputted to any of these data input/output means, the allocation control process operation by the allocation request judging circuit 51 is advanced to a further step SP2. At this step SP2, the allocation request judging circuit 51 judges as to whether or not a plurality of allocation request signals $REQ_1$ to $REQ_3$ are supplied within a predetermined time period. When this judgment result is "YES", the process operation is advanced to a step SP3. Assuming now that both the allocation request signal $REQ_1$ and the allocation request signal $REQ_3$ are supplied, the judgment result at the step SP2 becomes "YES". As a result, the allocation request judging circuit 51 supplies the identification numbers corresponding to these allocation request signals $REQ_1$ and $REQ_3$ to both the order-varied allocation protocol producing circuit 52 and the order-fixed allocation protocol producing circuit 53, namely the identification numbers ① and ③ in this case. Thereafter, a process operation defined at a step SP3 is carried out in the allocation control circuit 36.

At this step SP3, in response to the protocol selection mode PSM for constituting the allocation protocol data APD, only one of the order-varied allocation protocol producing circuit 52 and the order-fixed allocation protocol producing circuit 53 is operable. As a result, after the designated protocol has been read out from the storage unit, this allocation protocol producing circuit determines such an identification number having a top priority within this time period among these supplied identification numbers of the plural data input/output means based upon both the read protocol and the sequence data OD for constituting the supplied allocation protocol data APD. Thereafter, this allocation protocol producing circuit supplies the determined identification number to the multiplexer 54. It should be understood that when such a protocol is not changed by the protocol selection mode PSM for constituting the allocation protocol data APD, both is used over a plurality of time periods, the protocol is not read out from the storage unit, but only the priority order is merely changed into an order which should be used in the next time period. For instance, in the case that the order rotation type order-fixed allocation protocol shown in FIG. 3(2) is used, when the priority order in the preceding time period is equal to a column of a left end (namely, ①, ②, ③, and ④ in this order), the priority order in the next time period is changed into a second column from the left end (namely, ②, ③, ④, and ① in this order). Based upon the changed priority order, the allocation protocol producing circuit determines such an identification number having a top priority within the next time period is determined among the supplied identification numbers of the plural data input/output means. Subsequently, a process operation defined at a step SP3 is carried out by the allocation control circuit 36.

In this case, since the allocation protocol data APD indicates the perfect type order-fixed allocation protocol, the order-varied allocation protocol producing circuit 52 is not operated. Since the protocol selection mode PSM for constituting the supplied allocation protocol data APD designates the perfect type order-fixed allocation protocol, the order-fixed allocation protocol producing circuit 53 reads the designated perfect type order-fixed allocation protocol from the storage unit. Thereafter, based upon both the read perfect type order-fixed allocation protocol, and the sequence data OD (in this case, ②, ①, and ③ in this order) for constituting the supplied allocation protocol data APD, this order-fixed allocation protocol producing circuit 53 determines such an identification number having a top priority within the next time period among the supplied identification numbers (in this case, ① and ③) of the plural data input/output means. Then, this order-fixed allocation protocol producing circuit 53 supplies this determined identification number (namely, ① in this case) to the multiplexer 54. Subsequently, a process operation defined at a step SP4 is executed by the allocation control circuit 36.

At this step SP4, the multiplexer 54 supplies the identification number to the allocation permission signal producing circuit 55 at preselected timing. This identification signal is supplied from either the order-varied allocation protocol producing circuit 52 or the order-fixed allocation protocol producing circuit 53. As a result, the allocation permission signal producing circuit 55 produces an allocation permission signal GNT corresponding to the supplied identification number, and then supplies this allocation permission signal GNT at predetermined timing to the data input/output means. Thereafter, the allocation control process operation is ended. In this case, since the identification number ① is supplied from the order-fixed allocation protocol producing circuit 53 to the multiplexer 54, this identification number ① is supplied to the allocation permission signal producing circuit 55 at preselected timing. As a result, the allocation permission signal producing circuit 55 produces an allocation permission signal $GNT_1$ corresponding to the supplied identification number (namely, ① in this case), and then, furnishes this allocation permission signal $GNT_1$ to the corresponding data input/output means (namely, sound board 16) at preselected timing. As a consequence, the sound board 16 accesses the memory 16 via the bus 19 to produce the music signal based on the music data stored in the memory 12, and reproduces music sounds from the speaker 22 under control of the CPU 11. Then, when the sound board 16 accomplishes the production of the music signal and thus the occupation of the bus 19, this sound board 16 also produces a signal indicative of this completion to supply such a signal to the bus control apparatus 13. Otherwise, the sound board 16 brings the allocation request signal $REQ_1$ into a non-active state, and then, notifies this non-active state to the bus control apparatus 13.

To the contrary, when the judgment result at the step SP2 is "NO", in other words, when a plurality of allocation request signals $REQ_1$ to $REQ_3$ are not supplied within a predetermined time period, but only one allocation request signal REQ is supplied, the allocation control circuit 36 executes a process operation defined at a step SP5. At this step SP5, the multiplexer 54 supplies the identification number to the allocation permission signal producing circuit 55 at preselected timing. This identification signal is supplied from the allocation request judging circuit 51. As a result, the allocation permission signal producing circuit 55 produces an allocation permission signal GNT corresponding to the supplied identification number, and then supplies this allocation permission signal GNT at predetermined timing to the data input/output means. Thereafter, the allocation control process operation is ended.

Next, in the case that the user once turns OFF the power supply of the computer system, and as indicated in FIG. 2, the user newly mounts the LAN board 21 to the socket 20, and thereafter, the user again turn ON the power supply of the computer system, the CPU 11 commences the control operations of the respective structural elements of this computer system, for instance, the CPU 11 reads the operation system (OS) software from the memory 12 via the bus control apparatus 13 so as to initiate this computer system.

In this case, the CPU 11 supplies both the protocol update cycle value and the protocol selection mode PSM to the bus control apparatus 13. Thereafter, since the LAN board 21 is newly mounted to the socket 20, the CPU 11 may recognize this LAN board 21. It is so assumed that as the protocol update cycle value, for example, 300 clocks are supplied as the protocol selection mode PSM, and for example, the order rotation type order-varied allocation protocol is supplied. Alternatively, both the protocol update cycle value and the protocol selection mode PSM may be set by that the user manipulates the keyboard 15.

As a result, 300 clocks are set as the protocol update cycle value into the protocol update cycle setting register 32, whereas the order rotation type order-varied allocation protocol is set as the protocol selection mode PSM into the protocol selection mode register 34.

Under such a condition, the bus control apparatus 13 performs the below-mentioned operations:

First of all, since the protocol update cycle value (in this case, 300 clocks are now loaded) set in the protocol update cycle setting register 32 is loaded, the timer 33 counts up the system clocks every 1 clock from zero. When the counted value becomes equal to the 300 clocks, this timer 33 supplies the overflow signal SOF to the counters $31_1$ to $31_3$, and also the protocol control circuit 35. Also, this count value is reset to zero. The counters $31_1$ to $31_3$ count the numbers of allocation request signals $REQ_1$ to $REQ_4$ supplied from the corresponding data input/output means, and then supply the counted values $CN_1$ to $CN_4$ to the protocol control circuit 35. It is now assumed that these counted values $CN_1$ to $CN_4$ own the largest value $CN_2$, the medium values $CN_4$ and $CN_1$, and the smallest value $CN_3$ in a certain protocol update cycle (in this case, a time period of 300 clocks).

As a consequence, in this protocol update cycle, the comparing circuit 41 of the protocol control circuit 35 sequentially compares the counted values $CN_1$ to $CN_4$ supplied from the counters $31_1$ to $31_4$ with each other so as to rearrange these counted values $CN_1$ to $CN_4$ in this order of $CN_2$, $CN_4$, $CN_1$, and $CN_3$, namely the larger value order. Then, this comparing circuit 41 produces the sequence data OD indicative of the sequence of the rearranged counted values CN, namely the sequence of identification numbers, i.e., ②, ④, ①, and ③ in this case. As a result, the allocation protocol/data producing circuit 42 produces the allocation protocol data APD based upon both the sequence data OD, and the protocol selection mode PSM loaded from the protocol selection mode register 34. Then, this allocation protocol data producing circuit 42 supplies the produced allocation protocol data APD to the allocation control circuit 36. In this case, since the order rotation type order-varied allocation protocol is set as the protocol selection mode PSM, this allocation protocol data producing circuit 42 produces the allocation protocol data APD based upon both the sequence data OD indicative of , ②, ④, ①, and ③, and the protocol selection mode PSM representative of the order rotation type order-varied allocation protocol. Then, the allocation protocol data producing circuit 42 supplies this allocation protocol data APD to the allocation control circuit 36.

Next, when a plurality of allocation request signals REQ are supplied within a preselected time period, for example, when the allocation request signals $REQ_1$, $REQ_3$, and $REQ_4$ are supplied, the allocation request judging circuit 51 of the allocation control circuit 36 supplies the identification numbers corresponding to these allocation request signals, namely ①, ③, and ④ in this case, to both the order-varied allocation protocol producing circuit 52 and the order-fixed allocation protocol producing circuit 53. Next, in response to the protocol selection mode PSM for constituting the allocation protocol data APD, only one of the order-varied allocation protocol producing circuit 52 and the order-fixed allocation protocol producing circuit 53 is operable. In this case, since the allocation protocol data APD indicates the order rotation type order-varied allocation protocol, the order-fixed allocation protocol producing circuit 53 is not operated. Since the protocol selection mode PSM for constituting the supplied allocation protocol data APD designates the order rotation type order-varied allocation protocol, the order-varied allocation protocol producing circuit 52 reads the designated order-rotation type order-varied allocation protocol from the storage unit in a first time period. Thereafter, based upon both the read order-rotation type order-fixed allocation protocol, and the sequence data OD (in this case, ②, ④, ①, and ③ in this order) for constituting the supplied allocation protocol data APD, this order-varied allocation protocol producing circuit 52 determines such an identification number having a top priority within the next time period among the supplied identification numbers (in this case, ①, ③, and ④) of the plural data input/output means. Then, this order-varied allocation protocol producing circuit 52 supplies this determined identification number (refer to FIG. 4(2), i.e., ④, assuming now that his next time period is equal to a second time period). Then, this determined identification number is supplied to the multiplexer 54.

As a result, the multiplexer 54 supplies the identification number to the allocation permission signal producing circuit 55 at preselected timing. This identification signal ((④ in this case) is supplied from the order-varied allocation protocol producing circuit 52. As a result, the allocation permission signal producing circuit 55 produces an allocation permission signal $GNT_4$ corresponding to the supplied identification number ((④ in this case), and then supplies this allocation permission signal $GNT_4$ at predetermined timing to the data input/output means corresponding thereto, namely the LAN board 21. As a consequence, the LAN board 21 accesses the memory 16 via the bus 19 to transmit the data signal stored in the memory 12 to another computer system via a cable. Also, this LAN board 21 receives data transmitted from another computer system via a cable and stores the received data into the memory 12. When the data transmission/reception are accomplished to end the occupation of the bus 19, this LAN board 21 also produces a signal indicative of this completion to supply such a signal to the bus control apparatus 13. Otherwise, the LAN board 19 brings the allocation request signal $REQ_4$ into a non-active state, and then, notifies this non-active state to the bus control apparatus 13.

As previously explained in detail, in accordance with the first bus control apparatus, the plural counters 31 are merely provided, the total number of which are equal to those of the data input/output means (for example, LAN board and modem) connectable with the bus 19. Moreover, even when the user connects a plurality of data input/output means to this bus 19, the total number of which are smaller than the maximum number of these data input/output means connectable with the bus 19, the counting operation of such a counter corresponding to the not-connected data input/output means may be merely stopped. Also, as to the protocols, in the embodiment shown in FIG. 3 and FIG. 4, for the sake of simple explanation, there are indicated the sequential orders in such a case that the allocation is permitted to all of the data input/output means connected to the bus 19. However, according to this first embodiment, the protocols are no longer produced by considering the total quantity of these data input/output means, namely, the protocols have been produced by considering the total number of data input/output means in the prior art. As a consequence, in accordance with the arrangement of the first bus control apparatus, this bus control apparatus can be realized by employing the general-purpose structural elements and also the general-purpose operations.

In addition, according to this first bus control apparatus with the above-described arrangement, when the order-varied allocation protocol is employed, the priority order can be determined based upon the count value CN in a certain protocol update cycle, but is not fixed as in the prior art. As a consequence, even when the utilization condition of the bus 19 is drastically changed to thereby vary the priority orders, and/or the data input/output means is newly connected to the bus 19, there is no need to change the connection to the data input/output means, contrary to the prior art. Furthermore, in order to quickly accept such a case that the utilization condition of the bus 19 is rapidly varied, the protocol update cycle value to be set into the protocol update cycle setting register 32 may be simply selected to be a small value.

Arrangement/Operation of Second Bus Control Apparatus

Figure 8:
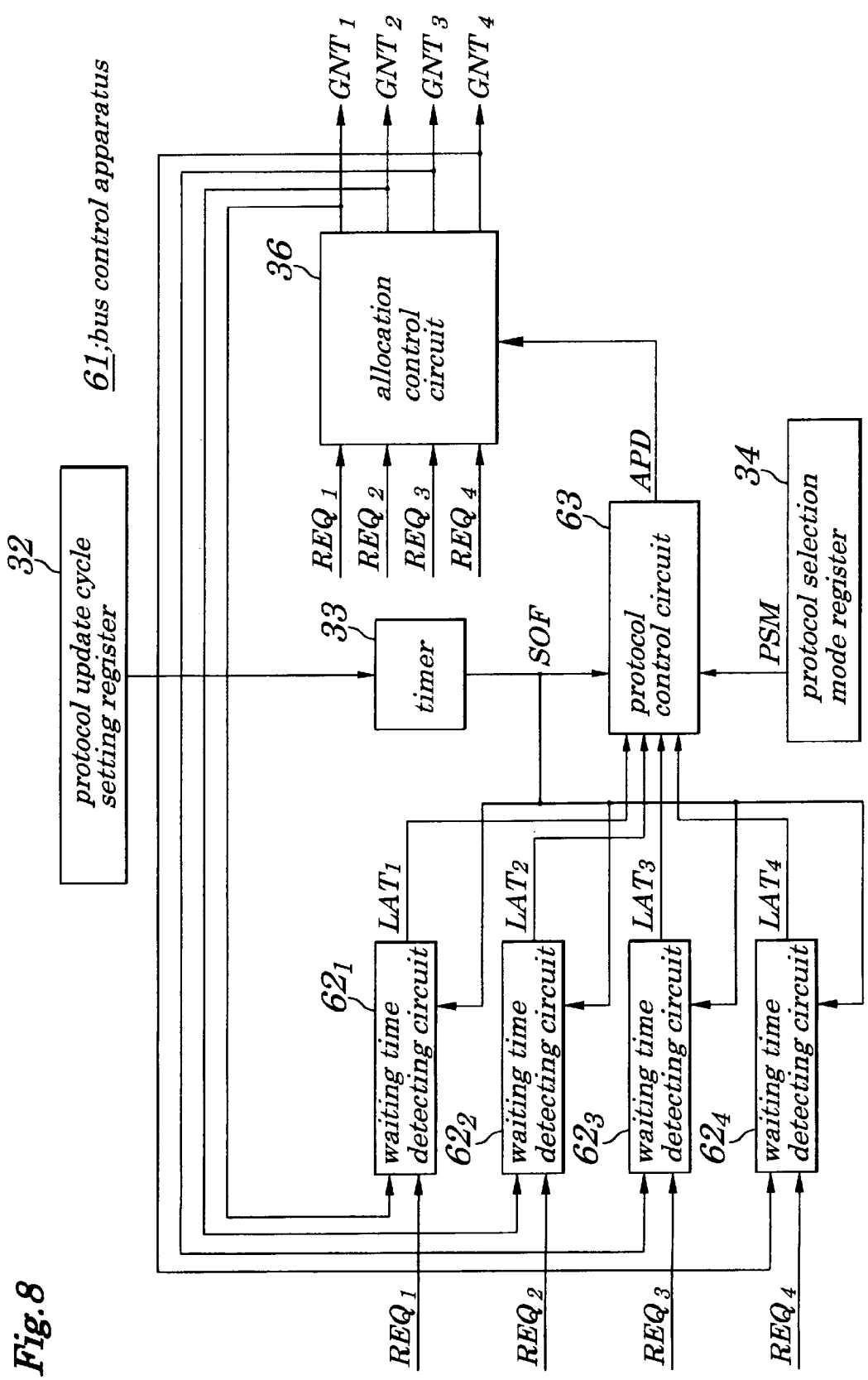
FIG. 8 is a schematic block diagram for indicating an internal arrangement of a bus control apparatus according to a second embodiment of the present invention.

Next, a second embodiment of the present invention will be explained. FIG. 8 is a schematic block diagram for showing an internal arrangement of a bus control apparatus 61 according to this second embodiment of the present invention. It should be noted that the same reference numerals shown in FIG. 1 will be employed as those for denoting the same, or similar structural elements indicated in FIG. 8, and therefore, detailed descriptions thereof are omitted. As apparent from FIG. 8, this second bus control apparatus 61 newly employs waiting time detecting circuits $62_1$ to $62_4$, and also a protocol control circuit 63, instead of the above-explained counters $31_1$ to $31_4$ and protocol control circuit 35 employed in the first bus control apparatus 13 of FIG. 1.

These waiting time detecting circuits $62_1$ to $62_4$ are provided in correspondence with the sound board 16, the modem 17, the graphic board 18, and the LAN board 21. When pulse-shaped allocation request signals $REQ_1$ to $REQ_4$ are supplied from the corresponding data input/output means, the waiting time detecting circuits $62_1$ to $62_4$ commence counting operations of system clocks, whereas when corresponding allocation permission signals $GNT_1$ to $GNT_4$ are supplied from the allocation control circuit 36, these waiting time detecting circuits $62_1$ to $62_4$ stop the counting operations of the system clocks. Then, the waiting time detecting circuits $62_1$ to $62_4$ supply the respective counted values of the system clocks to the protocol control circuit 63 as waiting time $LAT_1$ to $LAT_4$.

On the other hand, the protocol control circuit 63 is arranged by a comparing circuit (not shown) and an allocation protocol data producing circuit (not shown either). This comparing circuit compares the waiting time $LAT_1$ to $LAT_4$ with each other every time the protocol update cycle is executed. The waiting time $LAT_1$ to $LAT_4$ is supplied from the waiting time detecting circuits $62_1$ to $62_4$. As a result of this comparing operation, the waiting time $LAT_1$ to $LAT_4$ is rearranged in the order of longer time. Then, the comparing circuit produces a sequential order of the rearranged waiting time LAT, namely sequence data OD indicative of a sequential order of identification numbers, and thereafter outputs this sequence data OD to the allocation protocol data producing circuit. Subsequently, this allocation protocol data producing circuit produces allocation protocol data APD based upon both the sequence data OD, and also the protocol selection mode PSM loaded from the protocol selection mode register 34.

It should be understood that operations of the second bus control apparatus 61 with employment of the above-explained circuit arrangement are substantially identical to these of the first bus control apparatus 13, except that the parameters processed by the respective structural elements are simply changed from the counted values $CN_1$ to $CN_4$ to the waiting time $LAT_1$ to $LAT_4$. Accordingly, a detailed operation of this second bus control apparatus 61 is omitted.

As previously explained in detail, in accordance with the second bus control apparatus, since the allocation of the bus 19 is permitted based on the long/short time period of the waiting time LAT, not only the use efficiency of the bus 19, but also the operating rates of the respective data input/output means can be increased.

Arrangement/Operation of Third Bus Control Apparatus

Figure 9:
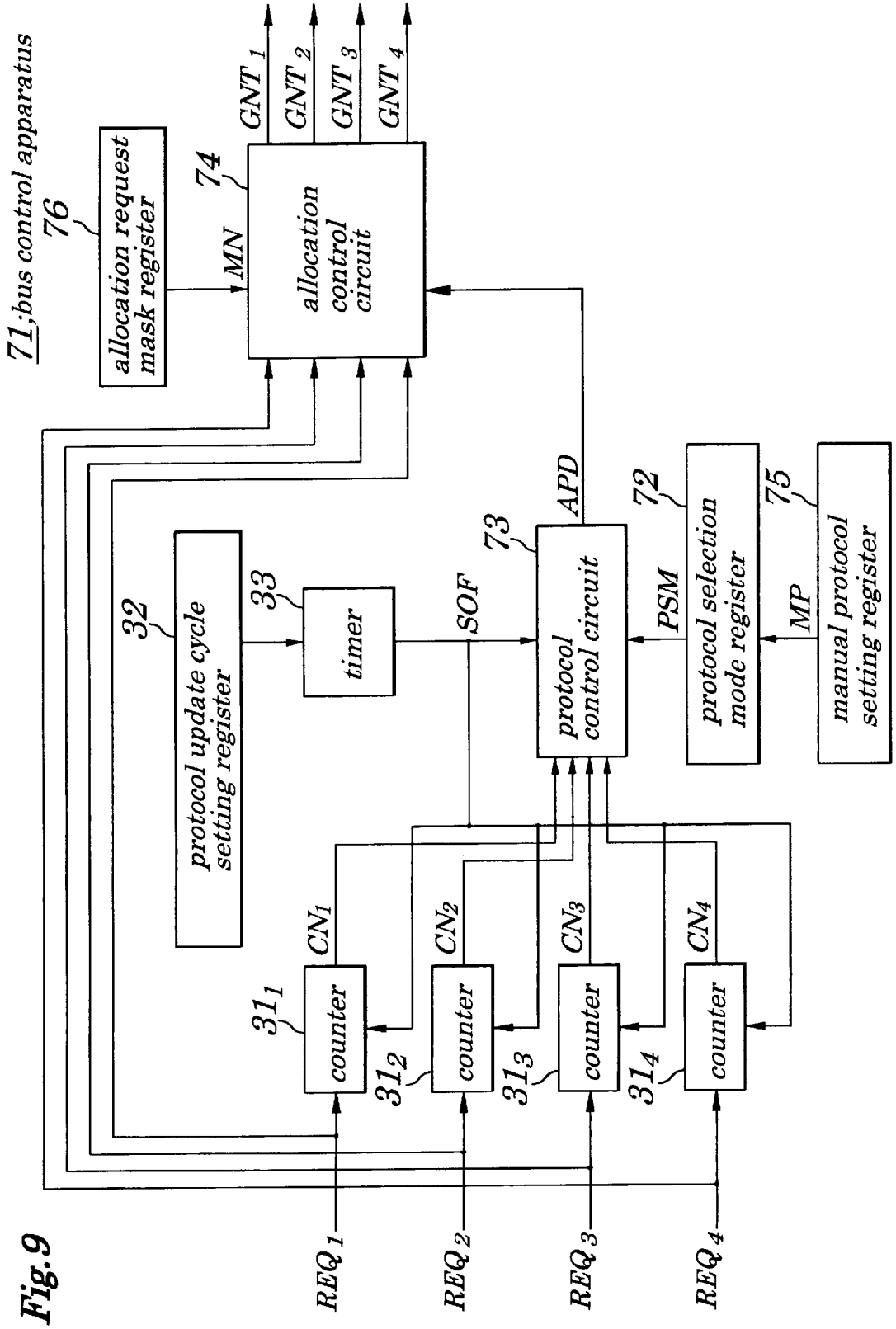
FIG. 9 is a schematic block diagram for indicating an internal arrangement of a bus control apparatus according to a third embodiment of the present invention.

Next, a third embodiment of the present invention will be explained. FIG. 9 is a schematic block diagram for showing an internal arrangement of a bus control apparatus 71 according to this second embodiment of the present invention. It should be noted that the same reference numerals shown in FIG. 1 will be employed as those for denoting the same, or similar structural elements indicated in FIG. 9, and therefore, detailed descriptions thereof are omitted. As apparent from FIG. 9, this third bus control apparatus 71 newly employs a protocol selection mode register 72, a protocol control circuit 73, an allocation control circuit 74, and furthermore, a manual protocol setting register 75, and an allocation request mask register 76, instead of the above-explained protocol control circuit 35 and allocation control circuit 36, and also protocol selection mode register 34 shown in FIG. 1.

A manual protocol "MP" is set to the manual protocol setting register 75. This manual protocol MP implies such data indicative of priority orders of the respective data input/output means. That is, when the user wants to manually and temporarily set allocations of the respective data input/output means to the bus 19 irrespective to the present utilization condition of the bus 19., this user manipulates the keyboard 15 to enter these priority orders of the data input/output means.

Similar to the above-described first embodiment, a protocol selection mode PSM is set to the protocol selection mode register 72 by the CPU 11. As the protocol selection mode PSM, not only data for instructing the selection of the above-described order-fixed allocation protocols and order-varied allocation protocols, but also the selection of the manual protocols MP set to the manual protocol setting register 75. The order-fixed allocation protocols contain the perfect type, order rotation type, and order emphasis type allocation protocols, whereas the order-varied allocation protocols contain the perfect type, order rotation type, order emphasis type, and composite type allocation protocols.

On the other hand, the protocol control circuit 73 is arranged by a comparing circuit (not shown) and an allocation protocol data producing circuit (not shown either). This comparing circuit is operable in a similar manner to that of the above-explained comparing circuit 41 shown in FIG. 5. However, this allocation protocol data producing circuit employed in the protocol control circuit 73 is operated in a different manner. That is, this allocation protocol data producing circuit produces allocation protocol data APD based upon the sequence data OD, the manual protocol MP loaded from the protocol selection mode register 72, and also the protocol selection mode PSM loaded from the protocol selection mode register 34. Then, the allocation protocol data producing circuit supplies this produced allocation protocol data APD to the allocation control circuit 74. In other words, when the protocol selection mode PSM is not equal to the data for instructing the selection of the manual protocol MP, this allocation protocol data producing circuit is operable in a similar manner to that of the above-mentioned allocation protocol data producing circuit 42 in the first embodiment. When the protocol selection mode PSM is equal to such data for instructing the selection of the manual protocol MP, this allocation protocol data producing circuit produces the allocation protocol data APD based on both the sequence data OD and the manual protocol MP to thereby supply this allocation protocol data APD to the allocation control circuit 74.

In the allocation request mask register 76, an identification number MN of such data input/output means is set, and this data input/output means whose allocation request should be invalidated is designated by either the user or the CPU 11. For example, while the CPU 11 instructs the graphic board 18 to form a figure, or a pattern based on data stored in a predetermined region of the memory 12, in the case that the user wants to stop the image forming operation by the graphic board 18 under such condition, for example, the data itself is error, and the incorrect storage region of the memory 12 is instructed, the identification number ③ for this graphic board 18 is set as the identification number MN to the allocation request mask register 76 in order not to supply the allocation request signal $REQ_3$ issued from this graphic board 18 to the allocation control circuit 74.

Figure 10:
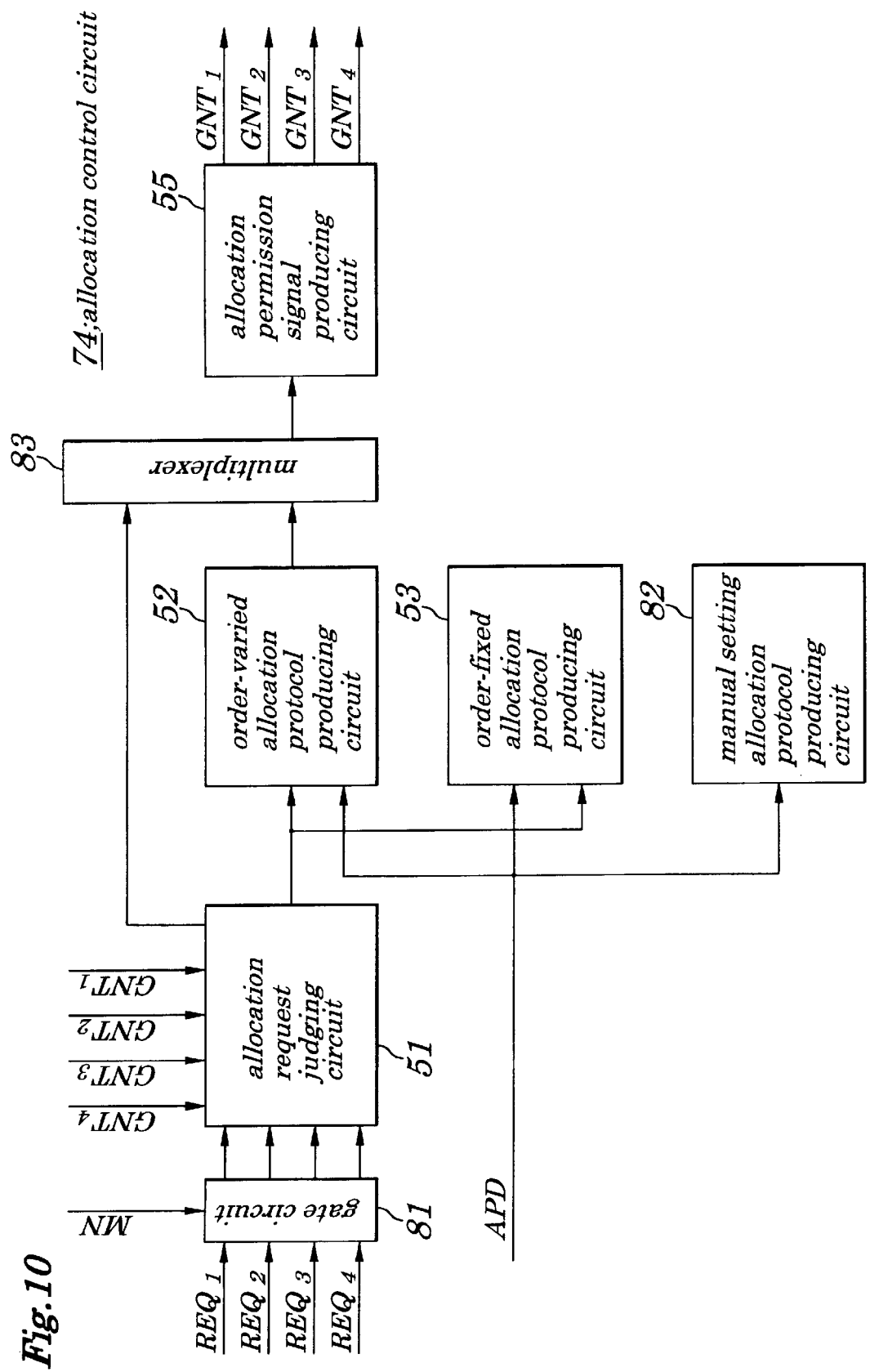
FIG. 10 is a schematic block diagram for representing an internal arrangement of an allocation control circuit employed in the bus control apparatus of the third embodiment.

As indicated in FIG. 10, the allocation control circuit 74 is arranged by a gate circuit 81, an allocation request judging circuit 51, an order-varied allocation protocol producing circuit 52, an order-fixed allocation protocol producing circuit 53, a manual setting allocation protocol producing circuit 82, a multiplexer 83, and an allocation permission signal producing circuit 55. Among these internal circuits, the structures and operations of the structural elements other than the gate circuit 81, the manual setting allocation protocol producing circuit 82, and the multiplexer 83 are substantially same as those of the respective structural elements employed in the allocation control circuit 36 shown in FIG. 6. Accordingly, descriptions of these same structural elements are omitted. The gate circuit 81 may cause only such allocation request signals $REQ_3$ other than the allocation request signal REQ corresponding to the identification number MN to pass therethrough. The last-mentioned allocation signal REQ is loaded from the allocation request mask register 76. Since, the allocation signal REQ corresponding to the identification number MN is not supplied to the any circuit subsequent to the allocation request judging circuit 51, the allocation of the bus 19 is not allowed to the corresponding data input/output means.

Also, in such a case that the supplied allocation protocol data APD is constituted by the sequence data OD and the manual protocol MP, the manual setting allocation protocol producing circuit 82 determines such an identification number having a top priority order in this time period based on the sequence data OD and the manual protocol MP among the supplied identification numbers of the plural data input/output means. This manual setting allocation protocol producing circuit 82 supplies this determined identification number to the multiplexer 83. The multiplexer 83 sequentially supplies identification numbers to the allocation permission signal producing circuit 55 at preselected timing.

These identification numbers are sequentially supplied from the allocation request judging circuit 51, the order-varied allocation protocol producing circuit 52, the order-fixed allocation protocol producing circuit 53, and the manual setting allocation protocol producing circuit 82.

It should also be noted that the above-described bus control apparatus 71 is specifically operable to allow the allocation of the bus 19 based upon the protocol which is temporarily and manually set by the user, and furthermore to invalidate the allocation request issued from the specific data input/output means. However, since other operations of this bus control apparatus 71 are substantially identical to those of the above-explained bus control apparatus 13 according to the first embodiment, no more detailed descriptions thereof are made in this description.

As previously explained, in the third bus control apparatus with employment of the above-described arrangement, in such an urgent case that the user wants to permit such a specific input/output means to allow the bus 19, the user temporarily may apply a first priority order to a printer (not shown) by manipulating the keyboard 15. For instance, while this printer 15 connected to the bus 19, the user urgently wants to print out data stored in the memory 12 by using this printer. As a result, even when the priority order owned by this printer is lower than that of other data input/output means, since the first priority order is applied to this printer only when the data is printed out, this operation may satisfy the user's urgent requirement. In this case, the allocations of the bus 19 with respect to other data input/output means are allowed with maintaining the previous priority orders after the printing operation by the printer. As a consequence, the user need not performs the cumbersome process operations, for example, the user is required to stop the operations of other data input/output means.

Also, in accordance with this third bus control apparatus, in such a case that an unwanted event happens to occur as to the permission of the bus allocation for a specific data input/output means, if the identification number of this specific data input/output means is set to the allocation request mask register 76, then the allocation request signal REQ is not supplied from this data input/output means to the allocation control circuit 74. As a consequence, the erroneous and useless operations can be avoided. It should also be understood that both the allocation request mask register 76 and the gate circuit 81 may be similarly applied to the arrangements of the first and second embodiments.

While the present invention has been described in detail with reference to the various preferred embodiments, the bus control apparatus, the bus control method, and also the storage medium, according to the present invention, are not limited thereto, but may be modified, changed, and substituted without departing from the technical scope and spirit of the present invention.

Figure 11:
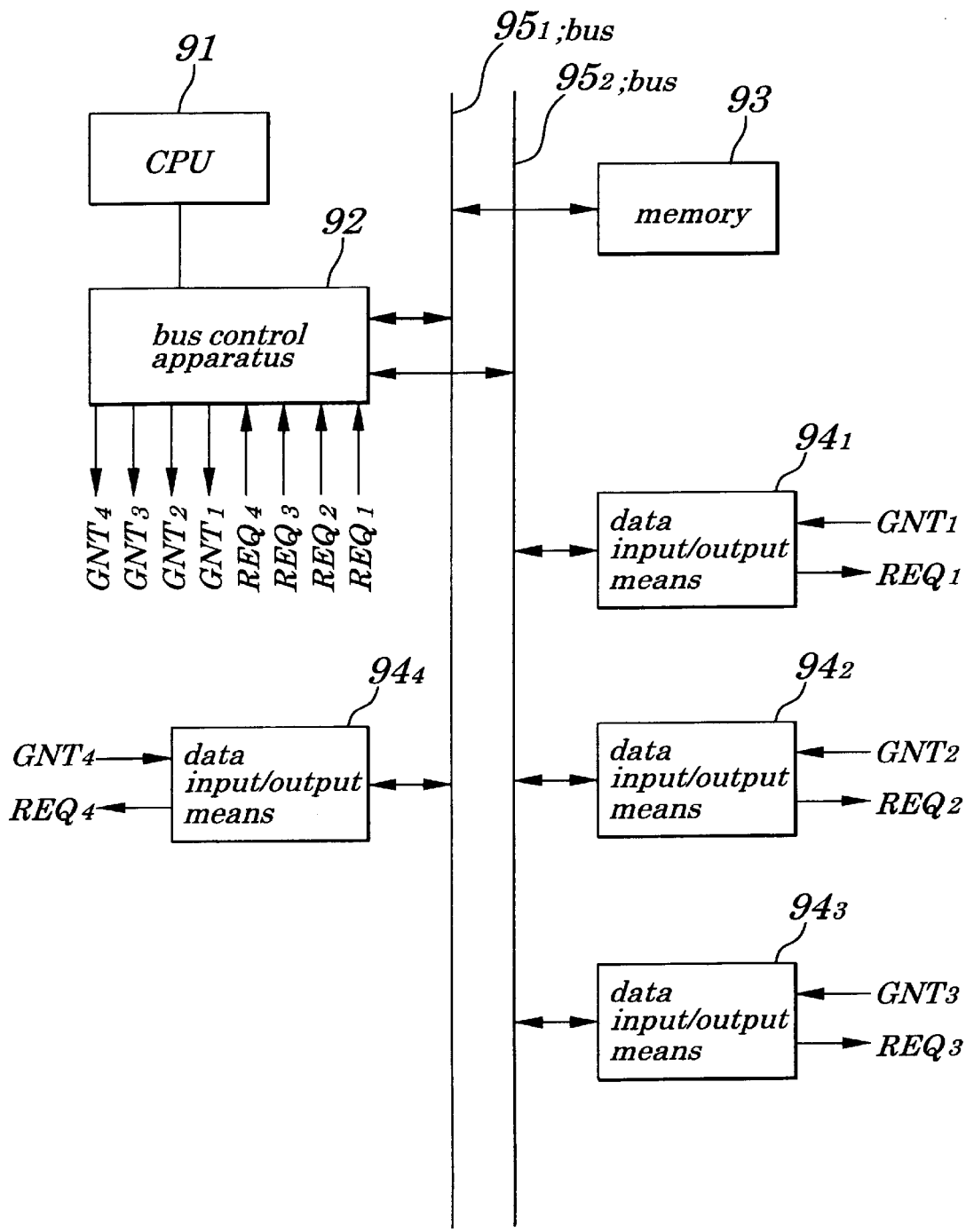
FIG. 11 schematically indicates an internal arrangement of a computer system including two buses, to which the bus control apparatus of the present invention is applied.
Figure 12:
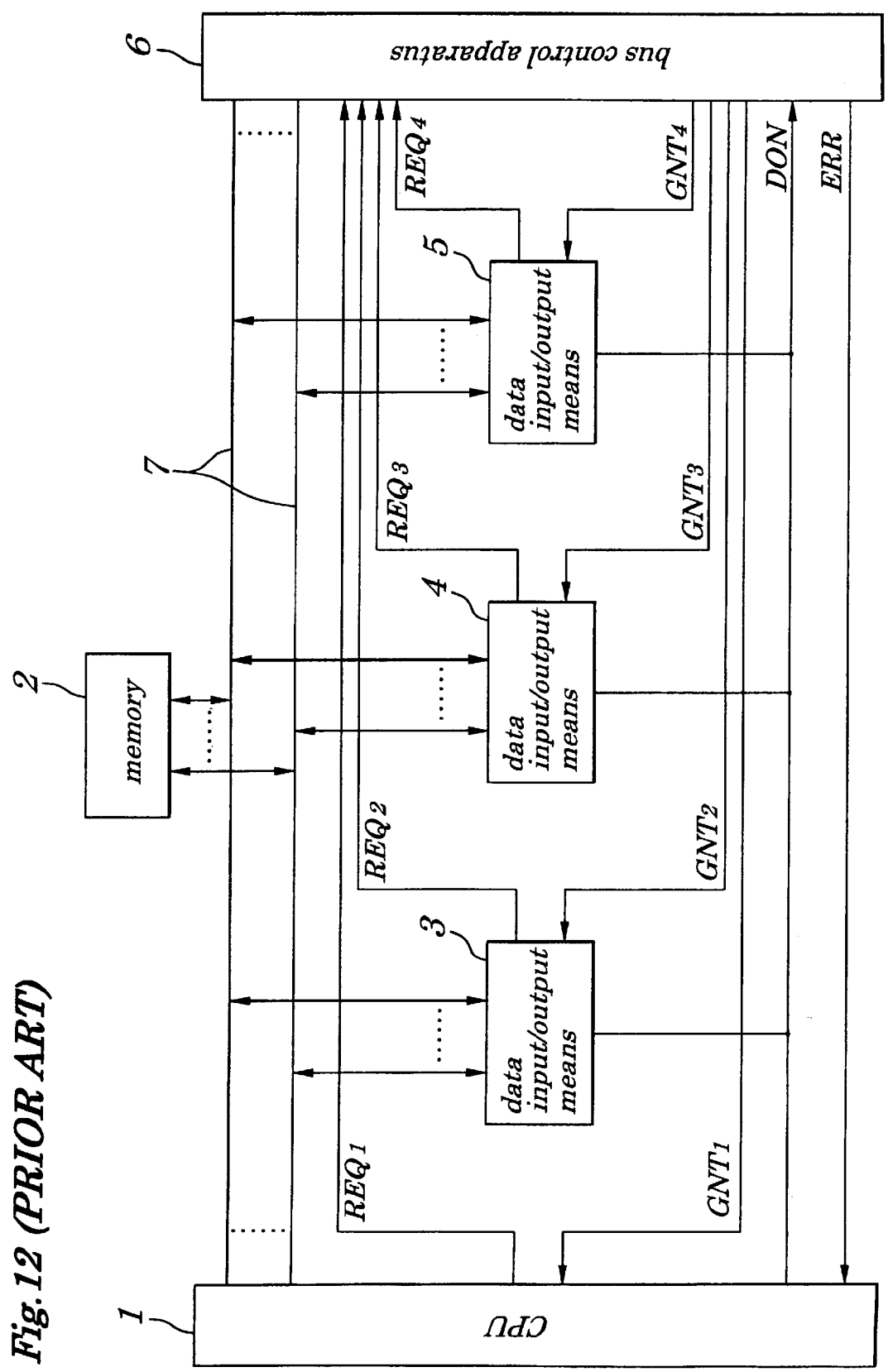
FIG. 12 schematically shows the internal arrangement of the computer system to which the conventional bus control apparatus is applied.

For instance, as represented in FIG. 2, in the above-described embodiments, the bus control apparatus according to the present invention has been applied to such a computer system with one set of bus 19. Apparently, the bus control apparatus of this invention may be similarly applied to another computer system with employment of a plurality of buses. As indicated in FIG. 11, for instance, this bus control apparatus of the present invention may be alternatively applied to the following computer system. That is to say, this computer system is arranged by a CPU 91, a bus control apparatus 92, a memory 93, data input/output means $94_1$ to $94_4$, and two sets of buses $95_1$ and $95_2$. The CPU 91 is connected to the bus control apparatus 92. This bus control apparatus 92, the memory 93, and the data input/output means $94_4$ are connected to each other via the bus $95_1$. This bus $95_1$ is capable of transferring 32-bit data and the like. Similarly, this bus control apparatus 92 is connected to the data input/output means $94_1$ to $94_3$ via another bus $95_2$ capable of transferring 16-bit data and the like. In this computer system, the bus control apparatus 92 may allow the allocations of both the buses $95_1$ and $95_2$, and the allocation of either the bus $95_1$ or the bus $95_2$ with respect to the respective data input/output means $94_1$ to $94_4$.

Also, as the parameter used to select the proper protocol, only the counted values $CN_1$ to $CN_4$ are used in the first and third embodiments, and only the waiting time $LAT_1$ to $LAT_4$ is used in the second embodiment. However, the present invention is not limited to these parameters. For instance, the waiting time $LAT_1$ to $LAT_4$ may be employed in the first and third embodiments, and similarly, the counted values $CN_1$ to $CN_4$ may be employed in the second embodiment as the parameters used to select the protocols. In this case, for example, the priority orders may be determined based upon the relative relationship among these parameters in such a manner that one data input/output means having a smaller counted value CN and longer waiting time LAT may have a higher priority order than another data input/output means having a longer counted value CN and shorter waiting time LAT. Furthermore, as the parameters for selecting the proper protocols, not only the above-explained counted value CN/waiting time LAT, but also bus use conditions of the respective data input/output means may be employed.

As the use condition of the bus, the following conditions may be conceived; data read/write operations are completed within one cycle, and data is read in a first cycle, and thereafter, the data is written in a next cycle.

Also, in the above-described embodiments, the higher priority orders are applied to the counted values CNs having the larger values, and the higher priority orders are applied to the waiting time LATs having the longer values. The present invention is not limited thereto, but may be modified, for example, the priority orders may be alternatively applied to the counted values CNs having the smaller values, or the waiting time LATs having the shorter values. This alternative priority order application may be utilized for the post process operations when a very specific event, e.g., a power interruption happens to occur.

Furthermore, in the above-explained embodiment, the bus control apparatus allows the allocation of the bus based on the protocol set by the CPU, but the present invention is not limited thereto. For instance, the protocol control circuit may be alternatively arranged in such a manner that this protocol control circuit stores thereinto the counted values CNs, the waiting time LATS, or the sequence data OD for a long time period, and thereafter compiles statistics on these stored data so as to determine such that which protocol should be used. Alternatively, this protocol control circuit itself may produce a proper protocol based on these statistical data. Also, it may be alternatively arranged that the CPU receives the counted values $CN_s$, the waiting time LATs, or the sequence data OD from the bus control apparatus for a long time period, and stores the received data into the memory. Thereafter, the CPU may compile statistics on these stored data so as to produce a proper protocol. This proper protocol may be set to, for example, the manual protocol setting register 75 shown in FIG. 9.

Also, in the above-explained embodiments, 7 sorts of protocols as shown in FIG. 3 and FIG. 4 are used as the protocol. The present invention is not limited to these protocols. For example, as to the order-varied allocation protocols indicated in FIG. 4(2) to FIG. 4(4), the priority order is determined one time during two time periods based only upon the values of the counted values Cns and the values of the waiting time LATs. Alternatively, the decision of the priority order may be carried out one time during three time periods, or may be continuously carried out during the time periods.

Moreover, in the above-explained embodiments, the bus control apparatus according to the present invention is applied to the computer system. Alternatively, this bus control apparatus according to the present invention may be applied to such an 1-chip microcomputer that, for example, the CPU 11, the memory 12, the bus control apparatus 13, the bus 19, and the interfaces of the respective data input/output means, indicated in FIG. 2, are formed on the same semiconductor chip. Also, the bus control apparatus according to the present invention may be similarly applied to such a LAN system that a CPU, a memory, a bus control apparatus, and the respective data input/output means are replaced by stand-alone type devices, and a bus is constituted by a cable.

Then, in such a case that the bus control apparatus is replaced by a stand-alone type to be applied to a LAN system, this bus control apparatus may be arranged by such a computer containing a CPU; internal storage device such as a ROM and a RAM; an external storage device such as a floppy-disk driver (FDD), a hard disk driver (HDD), and a CD-ROM driver; output means; and also input means. The above-explained counter, timer, protocol control circuit, and allocation control circuit may be arranged by a CPU. These functions are stored as a bus control program into a semiconductor memory such as a ROM, and/or a storage medium such as a floppy-disk, a hard disk, and a CD-ROM. In this alternative case, the above-explained internal storage devices, or external storage devices may constitute the protocol update cycle setting register, the protocol selection mode register, or the manual protocol setting register. The bus control program is read from the storage medium into the CPU so as to control the operations of this CPU. When the bus control program is initiated, this CPU may function as the counter, the timer, the protocol control circuit, and the allocation control circuit, and may execute the above-described process operation under control of the bus control program.

As previously described in detail, in accordance with the present invention, the bus control apparatus can be constituted by employing the simple arrangement, and further can be operated in high efficiencies. Moreover, the bus control apparatus of this invention can be quickly operated with high flexibility even when the various allocation requests are issued from the respective data input/output means. As a result, the use efficiency of the bus can be increased.

It is thus apparent that the present invention is not limited to the above embodiments but may be changed and modified without departing from the scope and spirit of the invention.

Finally, the present application claims the priority of Japanese Patent Application No. Hei 10-053296 filed on Mar. 5, 1998, which is herein incorporated by reference.

What is claimed is:

1. A bus control method comprising the steps of:
   performing at least one of steps a) and b);
   a) counting numbers of bus allocation requests issued from each of a plurality of data input/output devices within a predetermined time period and producing first sequential numbers based on the counted numbers;
   b) measuring waiting times defined by that after said bus allocation request is issued from each of said plural data input/output devices, and until said bus allocation request is allowed and producing second sequential numbers based on the waiting times; and
   c) selecting one of a plurality of different bus allocation protocols:
   d) allocating at least one bus to one of said data input/output devices based upon said selected protocol and at least one of (1) said counted bus allocation request number and said first sequence and (2) said measured waiting time and said second sequence, while said plurality of data input/output devices are connected to said at least one bus.

2. A bus control method according to claim 1 wherein:
   at least one of said allocation request number counting step and said waiting time measuring step is arbitrarily carried out.

3. A bus control method according to claim 1 wherein:
   said predetermined time period is variable.

4. A bus control method according to claim 1 wherein:
   the bus allocation executed in said bus allocating step is temporarily variable.

5. A bus control method according to claim 1, further comprising the steps of:
   applying, in advance, priority orders with respect to bus allocation permissions to said plurality of data input/output devices; and
   controlling said bus allocation to said data input/output devices based additionally upon said applied priority orders.

6. A bus control method comprising the steps of:
   a) counting numbers of bus allocation requests issued from each of a plurality of data input/output devices within a predetermined time period and producing first sequential numbers based on the counted numbers;
   b) measuring waiting times defined by that after said bus allocation request is issued from each of said plural data input/output devices, and until said bus allocation request is allowed and producing second sequential numbers based on the waiting time; and
   c) allocation at least one bus to one of said data input/output devices based upon both said counted bus allocation request number and said first sequence and said measured waiting time and said second sequence, while said plurality of data input/output devices are connected to said at least one bus.

7. A bus control method according to claim 6 wherein:
   at least one of said allocation request number counting step and said waiting time measuring step is arbitrarily carried out.

8. A bus control method according to claim 6 wherein:
   said predetermined time period is variable.

9. A bus control method according to claim 6 wherein:
   the bus allocation executed in said bus allocating step is temporarily variable.

10. A bus control method according to claim 6, further comprising the steps of:
    applying, in advance, priority orders with respect to bus allocation permissions to said plurality of data input/output devices; and
    controlling said bus allocation to said data input/output devices based additionally upon said applied priority orders.

11. A bus control system comprising:
- a plurality of data input/output devices connected to at least one bus, for issuing a plurality of bus allocation requests;
- a plurality of counting devices for counting numbers of said bus allocation request issued from said plurality of data input/output devices within a predetermined time period;
- a bus allocation control circuit for controlling allocation of said bus to said data input/output devices based upon at least said counted bus allocation request numbers obtained by said plurality of counting devices;
- a protocol selection mode producing circuit for producing protocol selection mode data indicative of a selected bus allocation protocol; and
- a protocol control circuit for comparing said plurality of counted bus allocation request numbers with each other to produce sequence data, and for producing bus allocation permission data based on both said sequence data and said protocol selection mode data; whereby:
- said bus allocation control circuit controls said bus allocation to said data input/output devices in response to said bus allocation permission data.

12. A bus control system according to claim 11 wherein:
said protocol selection mode producing circuit comprises a protocol selection mode register for storing thereinto said protocol selection mode data.

13. A bus control system according to claim 11 wherein:
said protocol control circuit includes:
- a comparing circuit for comparing said plurality of counted bus allocation request numbers with each other, which are obtained from said plurality of counting devices; and
- an allocation protocol data producing circuit for processing said compared bus allocation request numbers and said protocol selection mode data to thereby produce allocation protocol data.

14. A bus control system according to claim 13 wherein:
said bus allocation control circuit includes at least:
- an allocation request judging circuit for judging which protocol is required in response to said bus allocation requests issued from said plural data input/output devices to thereby produce a protocol selection signal;
- an allocation protocol producing circuit for producing a bus allocation protocol in response to said protocol selection signal; and
- a bus allocation permission data producing circuit for producing said bus allocation permission data based upon said bus allocation protocol, whereby:
- sad bus allocation control circuit controls said bus allocation to said data input/output devices in response to said bus allocation permission data.

15. A bus control system according to claim 11, further comprising:
- a protocol update cycle setting register for previously storing thereinto a protocol update cycle value; and
- a timer for starting a time clock counting operation when said protocol update cycle value is loaded on said timer, and for supplying an overflow signal to said plurality of counting devices when said time clock counting operation reaches a preselected count value.

16. A bus control system according to claim 11, further comprising:
- a priority order applying devices for previously applying priority orders with respect to bus allocation permissions to said plurality of data input/output devices; whereby:
- said bus allocation control circuit controls said bus allocation permissions based on not only said counted bus allocation request numbers, but also said applied priority orders.

17. A bus control system according to claim 11 wherein:
said data input/output devices are selected from a memory, a display, a keyboard, a sound board, a modem, a graphic board, and a LAN (local area network) board.

18. A bus control system comprising:
- a plurality of data input/output devices connected to at least one bus, for issuing a plurality of bus allocation requests;
- a plurality of waiting time measuring circuits for measuring a plurality of waiting times defined after said plurality of bus allocation requests are issued from said plurality of data input/output devices, and until said bus allocation requests are allowed; and
- a bus allocation control device for controlling allocation of said bus to said data input/output devices based upon at least said measured waiting time obtained from said plurality of waiting time measuring circuits a protocol selection mode producing device for producing protocol selection mode data indicative of a selected bus allocation protocol; and
- a protocol control device for comparing said plurality of measured waiting times with each other to produce sequence data, and for producing bus allocation permission data based on both said sequence data and said protocol selection mode data,
- whereby said bus allocation control device controls said bus allocation to said data input/output device in response to said bus allocation permission data.

19. A bus control system according to claim 18 wherein:
said protocol selection mode producing device comprises a protocol selection mode register for storing thereinto said protocol selection mode data.

20. A bus control system according to claim 18 wherein:
said protocol control device includes:
- a comparing circuit for comparing said plurality of measured waiting time with each other, which are obtained from said plurality of waiting time measuring circuits; and
- an allocation protocol data producing circuit for processing said compared waiting time and said protocol selection mode data to thereby produce allocation protocol data.

21. A bus control system according to claim 20 wherein:
said bus allocation control device includes at least:
- an allocation request judging circuit for judging which protocol is required in response to said bus allocation requests issued from said plural data input/output devices to thereby produce a protocol selection signal;
- an allocation protocol producing circuit for producing a bus allocation protocol in response to said protocol selection signal; and
- a bus allocation permission data producing circuit for producing said bus allocation permission data based upon said bus allocation protocol, whereby:
- said bus allocation control device controls said bus allocation to said data input/output devices in response to said bus allocation permission data.

22. A bus control system according to claim 18, further comprising:

a protocol update cycle setting register for previously storing hereinto a protocol update cycle value; and a timer for starting a time clock counting operation when said protocol update cycle value is loaded in said timer, and for supplying an overflow signal to said plurality of waiting time measuring circuits when said time clock counting operation reaches a preselected count value.

23. A bus control system according to claim 12, further comprising:

a manual protocol setting register for storing thereinto a manual protocol set be a user; whereby:

said manual protocol is supplied to said protocol control circuit.

24. A computer system comprising:

at least one bus;

a plurality of data input/output means connected to said at least one bus, for issuing a plurality of bus allocation requests;

a bus control apparatus including: a plurality of counting means for counting numbers of said bus allocation requests issued from said plurality of data input/output means within a predetermined time period; and bus allocation control means for controlling such that said bus is allocated to which data input/output means based upon at least said counted bus allocation request numbers obtained by said plural counting means; and a CPU (central processing unit) for controlling at least said bus allocation control means.

25. A storage medium for storing a bus control program used to cause a computer to execute bus controlling steps of:

a) counting numbers of bus allocation requests issued from each of a plurality of data input/output devices within a predetermined time period and producing first sequential numbers based on the counted numbers;

b) measuring waiting times defined by that after said bus allocation request is issued from each of said plural data input/output devices, and until said bus allocation request is allowed and producing second sequential numbers based on the waiting times; and c) selecting one of a plurality of different bus allocation protocols;

d) allocating at least one bus to one of said data input/output devices based upon said selected protocol and at least one of (1) said counted bus allocation request number and said first sequence and (2) said measured waiting time and said second sequence, while said plurality of data input/output devices are connected to said at least one bus.

26. A storage medium for storing a bus control program used to cause a computer to execute bus controlling steps of:

counting numbers of bus allocation requests issued from a plurality of plural data input/output devices within a predetermined time period;

measuring waiting times defined by that after said bus allocation request is issued from each of said plural data input/output devices, and until said bus allocation request is allowed; and allocating at least one bus to one of said data input/output device based upon both said counted bus allocation request number and said measured waiting time, said plurality of data input/output devices being connected to said at least one bus.

* * * * *

UNITED STATES PATENT AND TRADEMARK OFFICE
CERTIFICATE OF CORRECTION

PATENT NO. : 6,226,702 B1
DATED : May 1, 2001
INVENTOR(S) : Yakashiro

It is certified that error appears in the above-identified patent and that said Letters Patent is hereby corrected as shown below:

<u>Title page,</u>
Item [30], Foreign Application Priority Data, delete "May 3, 1998" and replace with -- March 5, 1998 --.

Signed and Sealed this

Twenty-ninth Day of January, 2002

*Attest:*

JAMES E. ROGAN
*Attesting Officer*   *Director of the United States Patent and Trademark Office*